(12) United States Patent
Tsuchiya

(10) Patent No.: US 12,157,386 B2
(45) Date of Patent: Dec. 3, 2024

(54) CONTROL SYSTEM AND ENERGY MANAGEMENT METHOD

(71) Applicant: TOYOTA JIDOSHA KABUSHIKI KAISHA, Toyota (JP)

(72) Inventor: Yoshiyuki Tsuchiya, Hamamatsu (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 531 days.

(21) Appl. No.: 17/671,754

(22) Filed: Feb. 15, 2022

(65) Prior Publication Data

US 2022/0289060 A1  Sep. 15, 2022

(30) Foreign Application Priority Data

Mar. 12, 2021  (JP) ................. 2021-040357

(51) Int. Cl.

| | |
|---|---|
| B60L 53/63 | (2019.01) |
| B60L 53/20 | (2019.01) |
| B60L 53/66 | (2019.01) |
| B60L 53/68 | (2019.01) |
| B60L 58/24 | (2019.01) |
| H02J 3/32 | (2006.01) |
| H02J 7/00 | (2006.01) |
| H02J 13/00 | (2006.01) |

(52) U.S. Cl.
CPC ............. *B60L 53/63* (2019.02); *B60L 53/20* (2019.02); *B60L 53/66* (2019.02); *B60L 53/68* (2019.02); *B60L 58/24* (2019.02); *H02J 3/322* (2020.01); *H02J 7/0071* (2020.01); *H02J 13/00006* (2020.01); *H02J 7/0048* (2020.01); *H02J 2300/24* (2020.01); *H02J 2300/28* (2020.01)

(58) Field of Classification Search
USPC ........................................................ 320/142
See application file for complete search history.

(56) References Cited

U.S. PATENT DOCUMENTS

| 2019/0214693 A1* | 7/2019 | Iida ..................... H01M 10/443 |
| 2021/0061129 A1 | 3/2021 | Nakamura et al. |
| 2022/0289060 A1* | 9/2022 | Tsuchiya .................. H02J 1/14 |

FOREIGN PATENT DOCUMENTS

| JP | 2013-188103 A | 9/2013 |
| JP | 2014-158375 A | 8/2014 |
| JP | 2019-122174 A | 7/2019 |

(Continued)

*Primary Examiner* — Mohammed Alam
(74) *Attorney, Agent, or Firm* — Oliff PLC

(57) ABSTRACT

A control system is configured to control a power adjustment resource including an energy storage device configured to electrically connect to a power network, and a temperature control device configured to perform temperature control of the energy storage device. The control system includes: a first control device configured to control charging and discharging of the energy storage device; a second control device configured to control the temperature control device; and a third control device. The second control device is configured to select either external power or stored power and drives the temperature control device using the selected power. The third control device is configured to determine whether to permit power supply from the power network to the power adjustment resource based on supply and demand information of the power network, and switch between permission and prohibition of the power supply.

11 Claims, 12 Drawing Sheets

(56) References Cited

FOREIGN PATENT DOCUMENTS

| | | |
|---|---|---|
| JP | 2020-108301 A | 7/2020 |
| JP | 2021-034271 A | 3/2021 |
| JP | 7505423 B2 * | 6/2024 .............. B60L 53/20 |

* cited by examiner

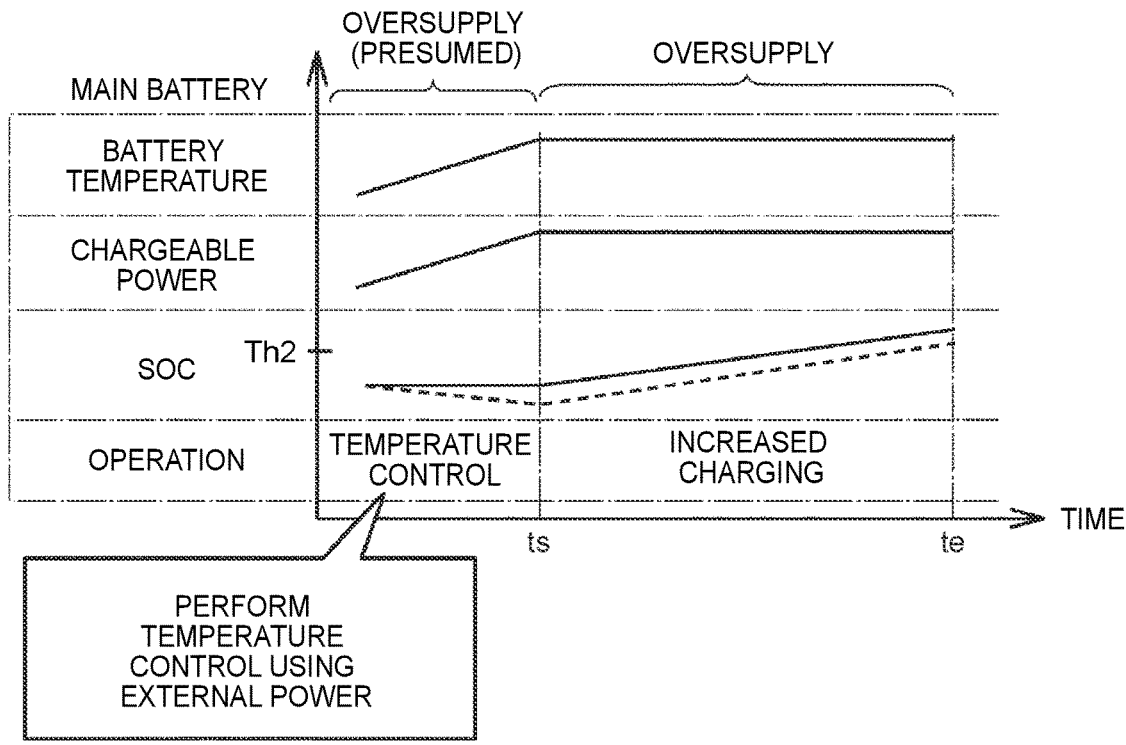
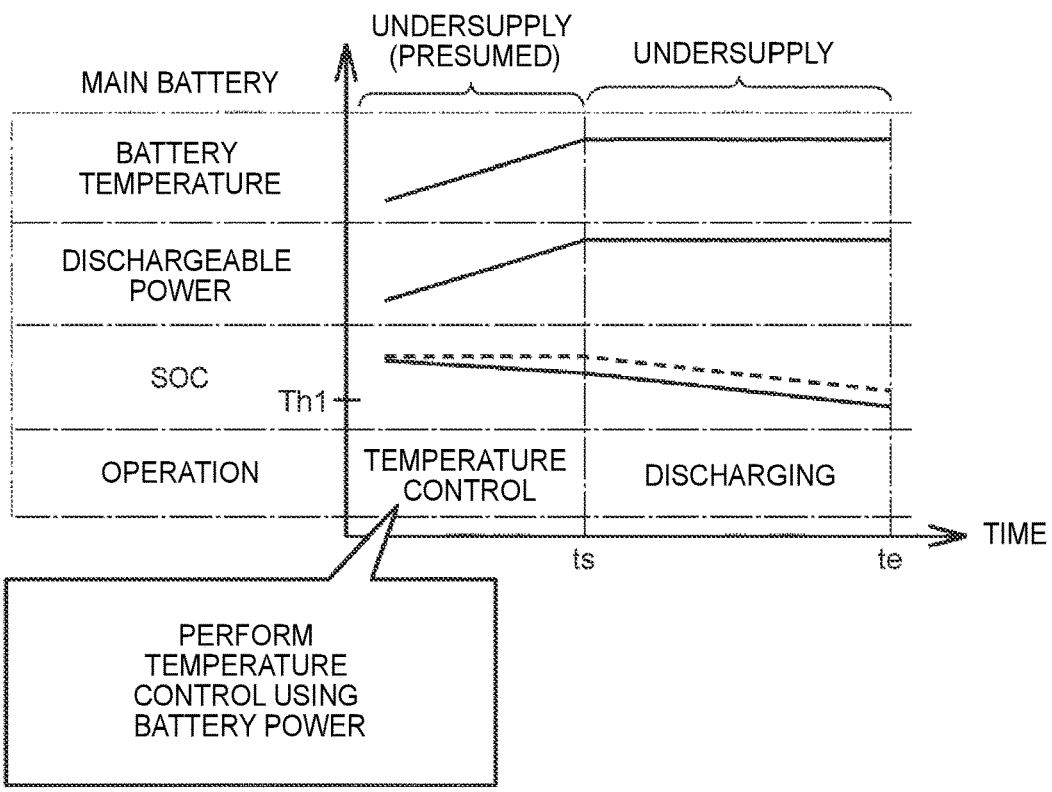

CONTROL SYSTEM AND ENERGY MANAGEMENT METHOD

CROSS-REFERENCE TO RELATED APPLICATION

This application claims priority to Japanese Patent Application No. 2021-040357 filed on Mar. 12, 2021, incorporated herein by reference in its entirety.

BACKGROUND

1. Technical Field

The present disclosure relates to control systems and energy management methods.

2. Description of Related Art

Japanese Unexamined Patent Application Publication No. 2019-122174 (JP 2019-122174 A) discloses a technique for providing an ancillary service using an energy storage device. Charge and discharge capability of an energy storage device (particularly, the power that can be output from the energy storage device and the power that can be input to the energy storage device) varies depending on the temperature of the energy storage device. Accordingly, when providing an ancillary service, a control system described in JP 2019-122174 A drives a temperature control device (heater, heat pump, cooling fan, etc.) to perform temperature control of the energy storage device by the temperature control device. The ancillary service is a service that maintains the quality of power in a power grid (power network).

SUMMARY

It is considered that the control system described in JP 2019-122174 A drives the temperature control device with the power stored in the energy storage device of a vehicle. In such a control system, the power of the energy storage device is consumed to drive the temperature control device. When the amount of power in the energy storage device is reduced by driving the temperature control device, it is difficult to discharge power from the energy storage device to the power grid when the power grid is undersupplied.

The present disclosure provides a control system and an energy management method for appropriately performing energy management of a power adjustment resource that performs power adjustment of a power network using an energy storage device.

A first embodiment of the present disclosure is a control system configured to control a power adjustment resource including an energy storage device and a temperature control device. The energy storage device is configured to electrically connect to a power network. The temperature control device is configured to perform temperature control of the energy storage device. The control system includes a first control device, a second control device, and a third control device. The first control device is configured to control charging and discharging of the energy storage device such that scheduled increased charging, reduced charging, or discharging of the energy storage device is started at predetermined start time. The second control device is configured to control the temperature control device so as to perform the temperature control of the energy storage device. The second control device is configured to select either external power or stored power. The external power is electric power supplied from the power network to the power adjustment resource. The stored power is electric power stored in the power adjustment resource. The second control device is configured to drive the temperature control device using the selected power. The third control device is configured to determine whether to permit power supply from the power network to the power adjustment resource before the predetermined start time based on supply and demand information of the power network. The third control device is configured to switch between permission and prohibition of the power supply.

The control system includes the first control device having the above configuration. The first control device can perform the power adjustment of the power network by the increased charging, reduced charging, or discharging of the energy storage device. The control system includes the second control device having the above configuration. By driving the temperature control device with the external power (that is, power supplied from the power network to the power adjustment resource), the second control device can suppress shortage of an amount of the stored power of the power adjustment resource. However, driving using the external power may increase power supply shortage in the power network. In this respect, the above control system includes the third control device having the above configuration. With the third control device, when the temperature control of the energy storage device is performed before the start of the scheduled increased charging, reduced charging, or discharging, the power supply from the power network to the power adjustment resource is prohibited according to a supply and demand situation of the power network. This suppresses an increase in power supply shortage in the power network. As described above, the above control system can appropriately perform energy management (power adjustment) of the power network and energy management of the power adjustment resource.

The supply and demand information of the power network may be information indicating the supply and demand situation of the power network (for example, supply and demand balance). The increased charging may be charge and discharge control in which predetermined charging is performed. The increased charging may be, for example, control in which charging is performed with predetermined charging power. The reduced charging may be charge and discharge control in which charging is limited. The reduced charging may be control in which charging with charging power larger than a predetermined value is prohibited or control in which charging with any charging power is prohibited.

The power adjustment resource may be configured to perform the power adjustment of the power network by charging and discharging of the energy storage device. The power adjustment resource may be a moving body equipped with the energy storage device or may be a stationary energy storage system (ESS). The temperature control device may include either or both of a heating device and a cooling device.

The amount of the stored power of the power adjustment resource may be an amount of stored power of the energy storage device. When the power adjustment resource includes a plurality of the energy storage devices, the amount of the stored power of the power adjustment resource may be the total amount of the stored power of the energy storage devices or may be the amount of stored power of a main one of the energy storage devices (the energy storage device with the largest capacity). The amount of the stored power may be represented by a state of charge (SOC). The SOC indicates the remaining capacity. For example, the SOC is the ratio of the current amount of stored power to the amount of stored power in a fully charged state and varies between 0% and 100%.

The stored power of the power adjustment resource is power stored in the power adjustment resource, and may be stored power of the energy storage device. The stored power of the power adjustment resource may be power stored in an energy storage device other than the energy storage device included in the power adjustment resource. That is, the energy storage device whose charging and discharging is controlled by the first control device and the energy storage device that supplies power to the temperature control device may be different energy storage devices.

The first to third control devices may be mounted together on one unit, or may be mounted separately on a plurality of units.

Hereinafter, the predetermined start time is sometimes referred to as the "time ts," and the temperature of the energy storage device is sometimes referred to as the "temperature TB."

In the control system according to the first embodiment of the present disclosure, the second control device may be configured to drive the temperature control device before the predetermined start time, when the second control device predicts the temperature of the energy storage device at the predetermined start time to be out of a desired temperature range.

The second control device can determine the necessity of the temperature control of the energy storage device based on the prediction result before the time ts, and can perform the temperature control of the energy storage device before the time ts, as necessary.

The desired temperature range may be any temperature range. The desired temperature range may be one point (desired temperature). The desired temperature range may be a fixed range or may be variable according to a predetermined parameter. The second control device may be configured to change the desired temperature range using the supply and demand information of the power network.

In the control system according to the first embodiment of the present disclosure, the second control device may be configured to drive the temperature control device using the stored power of the power adjustment resource, when the power supply is prohibited at a time of driving the temperature control device.

In the control system according to the first embodiment of the present disclosure, the third control device may be configured to permit the power supply when the supply and demand information of the power network indicates oversupply.

With the above configuration, the power can be supplied from the power network to the power adjustment resource when the power network is oversupplied. Since the power is supplied from the power network to the power adjustment resource when the power network is oversupplied, the supply and demand balance of the power network is improved, and the amount of the stored power of the power adjustment resource is less likely to become insufficient.

In the control system according to the first embodiment of the present disclosure, the third control device may be configured to prohibit the power supply when the supply and demand information of the power network indicates undersupply and an amount of the stored power of the power adjustment resource is equal to or larger than a predetermined first threshold.

In the above configuration, the power supply is prohibited when the supply and demand information of the power network indicates undersupply and the amount of the stored power of the power adjustment resource is sufficient. This suppresses an increase in power supply shortage in the power network. On the other hand, the power supply is not prohibited when the supply and demand information of the power network indicates undersupply and the amount of the stored power of the power adjustment resource is not sufficient. This suppresses the possibility of the amount of the stored power of the power adjustment resource becoming insufficient. With the above configuration, the supply and demand balance of the power network can be improved while not making the amount of the stored power of the power adjustment resource too small.

In the control system according to the first embodiment of the present disclosure, the first control device may be configured to charge the energy storage device with the power supplied from the power network to the power adjustment resource before the predetermined start time, when the discharging of the energy storage device is scheduled and the power supply is permitted.

With the above configuration, when the discharging of the energy storage device is scheduled in the first control device, the energy storage device is actively charged with the external power before the time ts. The energy storage device is therefore more likely to store the amount of power large enough for the scheduled discharging.

In the control system according to the first embodiment of the present disclosure, the second control device may be configured to drive the temperature control device using stored power of the energy storage device, before the predetermined start time, to bring the amount of the stored power of the energy storage device closer to a predetermined second threshold, when the increased charging of the energy storage device is scheduled in the first control device and the amount of the stored power of the energy storage device is equal to or larger than the predetermined second threshold.

With the above configuration, when the increased charging of the energy storage device is scheduled in the first control device and the amount of the stored power of the energy storage device is large, the stored power of the energy storage device is consumed before the time ts by driving the temperature control device. The capacity of the energy storage device is therefore more likely to become large enough for the scheduled increased charging.

In the control system according to the first embodiment of the present disclosure, the second control device may be configured not to drive the temperature control device before the predetermined start time when the reduced charging of the energy storage device is scheduled in the first control device and the amount of the stored power of the power adjustment resource is smaller than a predetermined third threshold.

It is considered that, in the reduced charging, high charge and discharge capability is not required for the energy storage device. In the above configuration, when the reduced charging of the energy storage device is scheduled in the first control device and the amount of the stored power of the power adjustment resource is not sufficient, the temperature control device is not driven and the power is not consumed for driving of the temperature control device. This suppresses an increase in power supply shortage in the power network and also reduces the possibility of the amount of the stored power of the power adjustment resource becoming insufficient. On the other hand, when the reduced charging of the energy storage device is scheduled in the first control device and the amount of the stored power of the power adjustment resource is sufficient, driving of the temperature control device is not prohibited. Therefore, the temperature control of the energy storage device can be performed as necessary.

In the control system according to the first embodiment of the present disclosure, the power adjustment resource may be an electrified vehicle that runs using power stored in the energy storage device. The control system may be mounted on the electrified vehicle. The electrified vehicle may be configured to receive a request signal that includes the supply and demand information of the power network. The electrified vehicle may be configured to be scheduled for the increased charging, the reduced charging, or the discharging that is requested by the request signal. The electrified vehicle may be configured to set the predetermined start time to time specified by the request signal. The electrified vehicle may be configured to perform the scheduled increased charging, the scheduled reduced charging, or the scheduled discharging with the power network being electrically connected to the energy storage device.

Since the above control systems include one of the above control systems mounted on the electrified vehicle having the above configuration, the power adjustment of the power network requested by a management computer and the energy management of the electrified vehicle can be appropriately performed.

The request signal may be sent from the management computer that manages the power network directly to the electrified vehicle, or may be sent from the management computer to the electrified vehicle via another device (for example, a mobile terminal carried by a vehicle user).

In the control system according to the first embodiment of the present disclosure, the control system may be mounted on the management computer that manages the power network. The management computer may be configured to receive an amount of the stored power of the power adjustment resource from the power adjustment resource. The management computer may be configured to schedule the increased charging, the reduced charging, or the discharging and set the predetermined start time, based on the supply and demand situation of the power network. The management computer may be configured to remotely control the power adjustment resource with the power network being electrically connected to the energy storage device in such a manner that the scheduled increased charging, the scheduled reduced charging, or the scheduled discharging is performed.

By mounting one of the above control systems on the management computer having the above configuration, the power adjustment of the power network and the energy management of the power adjustment resource can be appropriately performed.

A second embodiment of the present disclosure is an energy management method configured to perform power adjustment of a power network by using a power adjustment resource including an energy storage device and a temperature control device. The energy storage device is configured to electrically connect to the power network. The temperature control device is configured to perform temperature control of the energy storage device. The energy management method includes: requesting, by a management computer that manages the power network, the power adjustment resource to start the power adjustment of the power network at predetermined start time; performing the temperature control of the energy storage device before the predetermined start time by the power adjustment resource driving the temperature control device by using power supplied from the power network to the power adjustment resource, when the power adjustment requested by the management computer is discharging and an amount of stored power of the power adjustment resource is smaller than a predetermined first threshold; performing the temperature control of the energy storage device before the predetermined start time by the power adjustment resource driving the temperature control device by using the stored power of the power adjustment resource, when the power adjustment requested by the management computer is the discharging and the amount of the stored power of the power adjustment resource is equal to or larger than the predetermined first threshold; performing the temperature control of the energy storage device before the predetermined start time by the power adjustment resource driving the temperature control device by using the power supplied from the power network to the power adjustment resource, when the power adjustment requested by the management computer is increased charging and the amount of the stored power of the power adjustment resource is smaller than a predetermined second threshold; and starting the power adjustment requested by the management computer at the predetermined start time by the power adjustment resource.

Like in the above control system, the power adjustment of the power network and the energy management of the power adjustment resource can be appropriately performed with the above energy management method. Even when the power adjustment resource uses the power of the power network before the time ts although the management computer has requested the power adjustment resource to start the discharging at the predetermined start time (time ts), it does not mean that the power adjustment resource does not comply with the request. However, when the discharging has been requested by the management computer, it is likely that the power network is undersupplied not only at and after the time ts but also immediately before the time ts. When the increased charging has been requested by the management computer, it is likely that the power network is oversupplied not only at and after the time ts but also immediately before the time ts.

With the present disclosure, energy management of the power adjustment resource that performs power adjustment of the power network using the energy storage device can be appropriately performed.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 14 shows an operation example of the vehicle when increased charging is requested in the embodiment of the present disclosure;

FIG. 15 shows an operation example of the vehicle when discharging is requested in the embodiment of the present disclosure.

DETAILED DESCRIPTION OF EMBODIMENTS

Hereinafter, an embodiment of the present disclosure will be described in detail with reference to the drawings. The same or corresponding parts are denoted by the same signs throughout the drawings, and description thereof will not be repeated.

Figure 1:
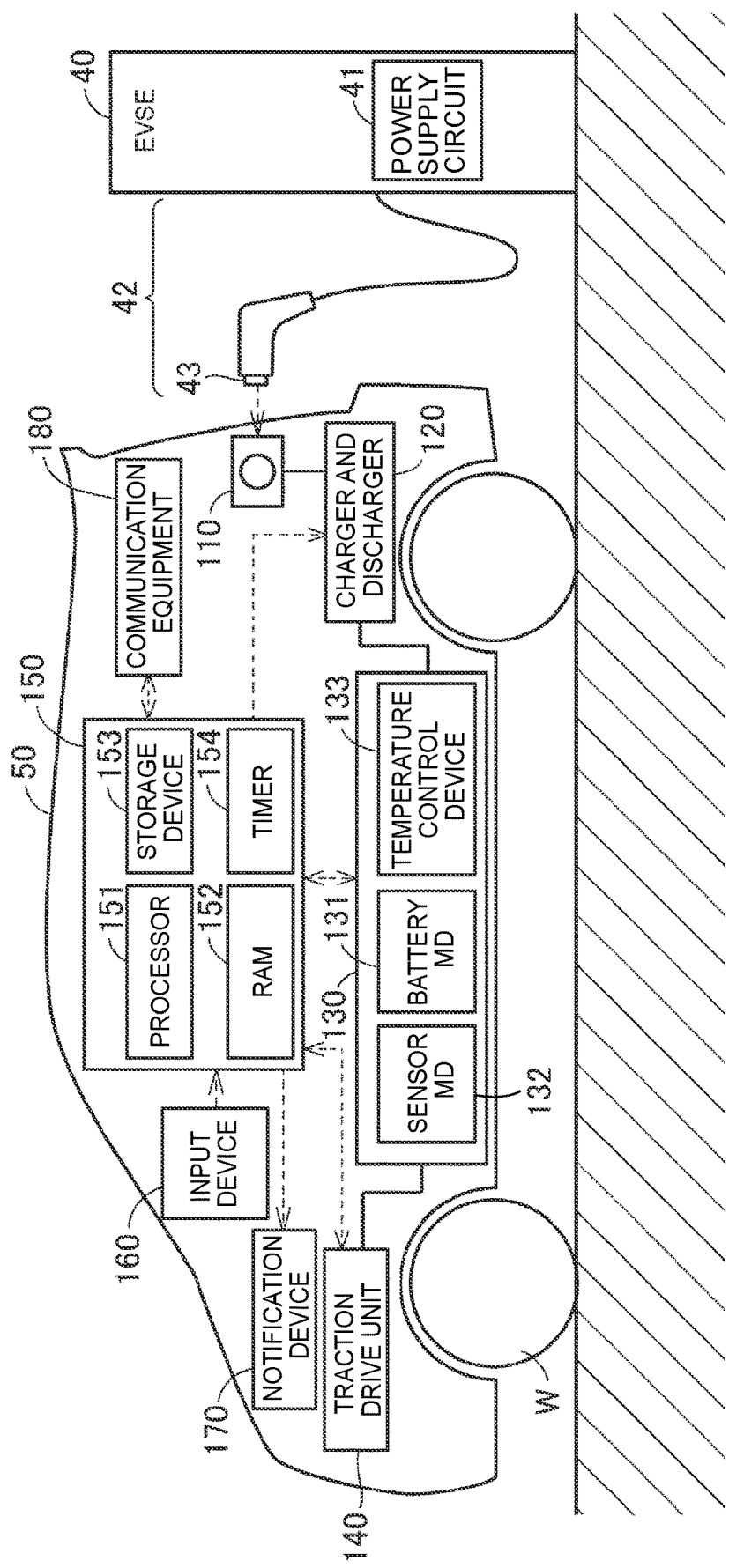
FIG. 1 schematically shows a configuration of a vehicle equipped with a control system according to an embodiment of the present disclosure.

FIG. 1 shows a configuration of a vehicle equipped with a control system according to an embodiment of the present disclosure. Referring to FIG. 1, a vehicle 50 includes an inlet 110, a charger and discharger 120, a battery pack 130, a traction drive unit 140, an electronic control unit (ECU) 150, an input device 160, a notification device 170, communication equipment 180, and drive wheels W. The battery pack 130 includes a battery module (hereinafter referred to as "battery MD") 131, a sensor module (hereinafter referred to as "sensor MD") 132, and a temperature control device 133.

Figure 2:
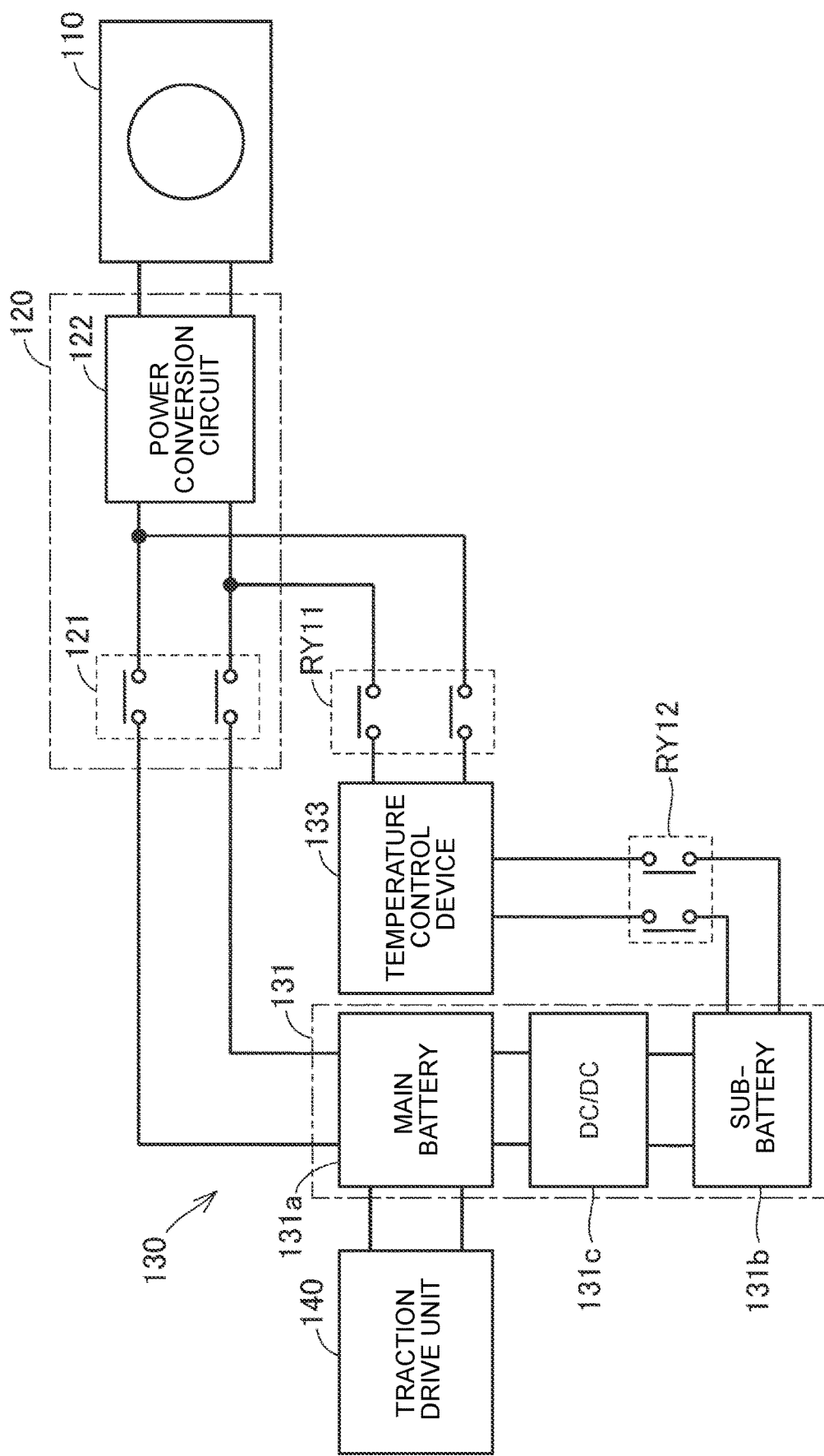
FIG. 2 shows a detailed configuration of a charger and discharger and a battery pack shown in FIG. 1.

FIG. 2 shows a detailed configuration of the charger and discharger 120 and the battery pack 130. Referring to FIG. 2 together with FIG. 1, the battery MD 131 includes a main battery 131a, a sub-battery 131b, and a direct current-to-direct current (DC-to-DC) converter 131c. The main battery 131a stores electric power for traveling. The sub-battery 131b supplies electric power to auxiliary machinery mounted on the vehicle 50. The main battery 131a is a secondary battery such as a lithium ion battery or a nickel metal hydride battery. The main battery 131a may be an assembled battery. The sub-battery 131b is a secondary battery such as a lead-acid battery or a nickel-metal hydride battery. The capacity of the sub-battery 131b is smaller than the capacity of the main battery 131a. The DC-to-DC converter 131c is configured to convert (for example, step down) the power supplied from the main battery 131a to DC power suitable for charging the sub-battery 131b and output the DC power to the sub-battery 131b. The DC-to-DC converter 131c is controlled by the ECU 150 (FIG. 1). The main battery 131a according to the present embodiment is an example of the "energy storage device" according to the present disclosure.

Although not shown in FIG. 2, the sensor MD 132 (FIG. 1) is configured to monitor the state of each of the main battery 131a and the sub-battery 131b. The sensor MD 132 includes various sensors that detect the state (for example, temperature, current, voltage, state of charge (SOC), and internal resistance) of each of the main battery 131a and the sub-battery 131b. The sensor MD 132 outputs the detection results to the ECU 150 (FIG. 1). The ECU 150 acquires the state (for example, temperature, current, voltage, SOC, and internal resistance) of each of the main battery 131a and the sub-battery 131b based on the output of the sensor MD 132 (that is, the detected values of the various sensors).

The charger and discharger 120 is located between the inlet 110 and the main battery 131a. The charger and discharger 120 includes a relay 121 and a power conversion circuit 122. The relay 121 is configured to switch open and close of a power path from the inlet 110 to the main battery 131a.

The temperature control device 133 is configured to perform temperature control of the main battery 131a. The temperature control device 133 includes a heating device that heats the main battery 131a and a cooling device that cools the main battery 131a (both not shown). In the present embodiment, the heating device is an electric heater. The cooling device is a radiator and a cooling fan. The temperature control device 133 is controlled by the ECU 150 (FIG. 1). The ECU 150 stops the cooling device and drives the heating device when raising the temperature of the main battery 131a. The ECU 150 stops the heating device and drives the cooling device when reducing the temperature of the main battery 131a. Each of the heating device and the cooling device included in the temperature control device 133 can be driven by either external power (more specifically, electric power supplied from the outside of the vehicle 50 to the inlet 110) or battery power (more specifically, electric power supplied from the main battery 131a and the sub-battery 131b). In the present embodiment, the vehicle 50 functions as a power adjustment resource. The battery power of the vehicle 50 is an example of the "stored power of the power adjustment resource" according to the present disclosure.

The battery pack 130 further includes relays RY11, RY12. Each of the relays RY11, RY12 is controlled by the ECU 150 (FIG. 1). The ECU 150 closes (connects) one of the relays RY11, RY12 when driving the temperature control device 133. The relay RY11 is configured to switch open and close of a power path from the inlet 110 to the temperature control device 133. The relay RY12 is configured to switch open and close of a power path from the sub-battery 131b to the temperature control device 133. When the relay RY11 is closed, the external power input to the inlet 110 is supplied to the temperature control device 133 via the power conversion circuit 122. When the relay RY12 is closed, the battery power is supplied from the sub-battery 131b to the temperature control device 133. When the SOC of the sub-battery 131b decreases, electric power is supplied from the main battery 131a to the sub-battery 131b. When the temperature control device 133 is stopped (OFF), both of the relays RY11, RY12 are open (disconnected).

Electrified vehicle supply equipment (EVSE) 40 shown in FIG. 1 includes a power supply circuit 41 and a charging cable 42. The power supply circuit 41 is a built-in power supply circuit in a body of the EVSE 40. The charging cable 42 is connected to the body of the EVSE 40. The charging cable 42 may always be connected to the body of the EVSE 40 or may be detachable from the body of the EVSE 40. The charging cable 42 has a connector 43 at its end and includes a power line inside. The EVSE 40 according to the present embodiment is alternating current (AC) power supply equipment that supplies AC power. As will be described in detail later, the EVSE 40 is compatible with reverse power flow. Although FIG. 1 shows only the inlet 110 and the charger and discharger 120 that are compatible with the power feeding method of the EVSE 40, the vehicle 50 may include a plurality of inlets so that the vehicle 50 is compatible with a plurality of power feeding methods (for example, AC method and DC method).

Referring to FIGS. 1 and 2, the vehicle 50 includes the inlet 110 and the charger and discharger 120 that are compatible with the power feeding method of the EVSE 40. The connector 43 of the charging cable 42 can be connected to the inlet 110. The EVSE 40 and the vehicle 50 are electrically connected by connecting (plugging in) the connector 43 of the charging cable 42 connected to the EVSE 40 to the inlet 110 of the vehicle 50. Electric power can thus be transferred between the EVSE 40 and the vehicle 50. The inlet 110 receives electric power supplied from the outside of the vehicle 50 (for example, the EVSE 40). The inlet 110 outputs electric power supplied from the battery pack 130 to the outside of the vehicle 50.

The power conversion circuit 122 shown in FIG. 2 is configured to perform AC-DC conversion in both directions. The power conversion circuit 122 is configured to convert AC power supplied from the EVSE 40 to DC power and output the DC power to the main battery 131a. The power conversion circuit 122 is also configured to convert DC power supplied from the main battery 131a to AC power and output the AC power to the inlet 110. For example, the power conversion circuit 122 can be a bidirectional inverter. The charger and discharger 120 may further include at least one of the following components: a rectifier circuit, a power factor correction circuit, an insulation circuit, a transformer (for example, an isolation transformer), and a filter circuit. The relay 121 and the power conversion circuit 122 are controlled by the ECU 150 (FIG. 1).

The vehicle 50 is configured to perform both external charging and external power feeding. External charging by the vehicle 50 refers to charging the main battery 131a with external power. External power feeding by the vehicle 50 refers to supplying electric power discharged from the main battery 131a to the outside of the vehicle 50. In external charging, the power conversion circuit 122 of the charger and discharger 120 converts electric power supplied from the inlet 110 to electric power suitable for charging the main battery 131a, and outputs the converted electric power to the main battery 131a. The main battery 131a is thus charged. In external power feeding, the power conversion circuit 122 of the charger and discharger 120 converts electric power discharged from the main battery 131a to electric power suitable for external power feeding, and outputs the converted electric power to the inlet 110. The electric power is thus output from the vehicle 50 to the outside. The relay 121 of the charger and discharger 120 is closed (connected) when the vehicle 50 performs either external charging or external power feeding. The relay 121 of the charger and discharger 120 is opened (disconnected) when the vehicle 50 performs neither external charging nor external power feeding.

The traction drive unit 140 includes a power control unit (PCU) and a motor generator (MG), both not shown, and is configured to drive the vehicle 50 with electric power stored in the main battery 131a. The PCU includes, for example, an inverter, a converter, and a relay (hereinafter referred to as "system main relay (SMR)") (none of which are shown). The PCU is controlled by the ECU 150. For example, the MG is a three-phase AC motor generator. The MG is configured to be driven by the PCU to rotate the drive wheels W. The PCU drives the MG with electric power supplied from the main battery 131a. The MG is also configured to regeneratively generate electric power and supply the generated electric power to the main battery 131a. The SMR is configured to switch open and close of a power path from the main battery 131a to the MG. The SMR is closed (connected) when the vehicle 50 is traveling.

As described above, the vehicle 50 is configured to run using electric power stored in the main battery 131a. The vehicle 50 may be an electric vehicle (battery electric vehicle (BEV)) with no internal combustion engine, or may be a plug-in hybrid vehicle (plug-in hybrid electric vehicle (PHEV)) that can run using both electric power stored in the main battery 131a and output of an internal combustion engine (not shown).

Referring to FIG. 1, the ECU 150 includes a processor 151, a random access memory (RAM) 152, a storage device 153, and a timer 154. For example, the processor 151 can be a central processing unit (CPU). The RAM 152 functions as a working memory for temporarily storing data that is processed by the processor 151. The storage device 153 is configured to be able to save stored information. The storage device 153 includes, for example, a read-only memory (ROM) and a rewritable nonvolatile memory. The storage device 153 stores, in addition to a program, information to be used in the program (for example, maps, mathematical expressions, and various parameters). In the present embodiment, various controls in the ECU 150 are performed by the processor 151 executing the program stored in the storage device 153. The various controls in the ECU 150 are not limited to be performed by software, and may be performed by dedicated hardware (electronic circuit). The ECU 150 may include any number of processors, and may have a processor for each predetermined control.

The timer 154 is configured to notify the processor 151 that set time comes. When the time set on the timer 154 comes, the timer 154 sends a notification signal to the processor 151. In the present embodiment, the timer 154 is a timer circuit. However, the timer 154 may be implemented by software instead of hardware (timer circuit). The ECU 150 can acquire the current time using a built-in real-time clock (RTC) circuit (not shown) in the ECU 150.

The input device 160 is a device that accepts input from the user. The input device 160 is operated by the user and outputs signals corresponding to the user's operations to the ECU 150. The communication method may be either wired or wireless. Examples of the input device 160 include various switches, various pointing devices, a keyboard, and a touch panel. The input device 160 may include a smart speaker that accepts voice input. The input device 160 may be an operation unit of a car navigation system.

The notification device 170 is configured to perform a predetermined notification process of notifying the user (for example, an occupant of the vehicle 50) when requested by the ECU 150. The notification device 170 may include at least one of the following components: a display device (for example, a touch panel display), a speaker, and a lamp (for example, a malfunction indicator lamp (MIL)). The notification device 170 may be an instrument panel, a head-up display, or a display unit of the car navigation system.

The communication equipment 180 includes various communication interfaces (I/Fs). The communication equipment 180 includes a communication I/F for wireless communication with a server 30 (see FIG. 3) that will be described later. The communication equipment 180 may include a Data Communication Module (DCM). The communication equipment 180 may include a communication I/F compatible with a fifth generation mobile communication system (5G). The ECU 150 is configured to communicate with a communication device outside the vehicle 50 through the communication equipment 180.

Figure 3:
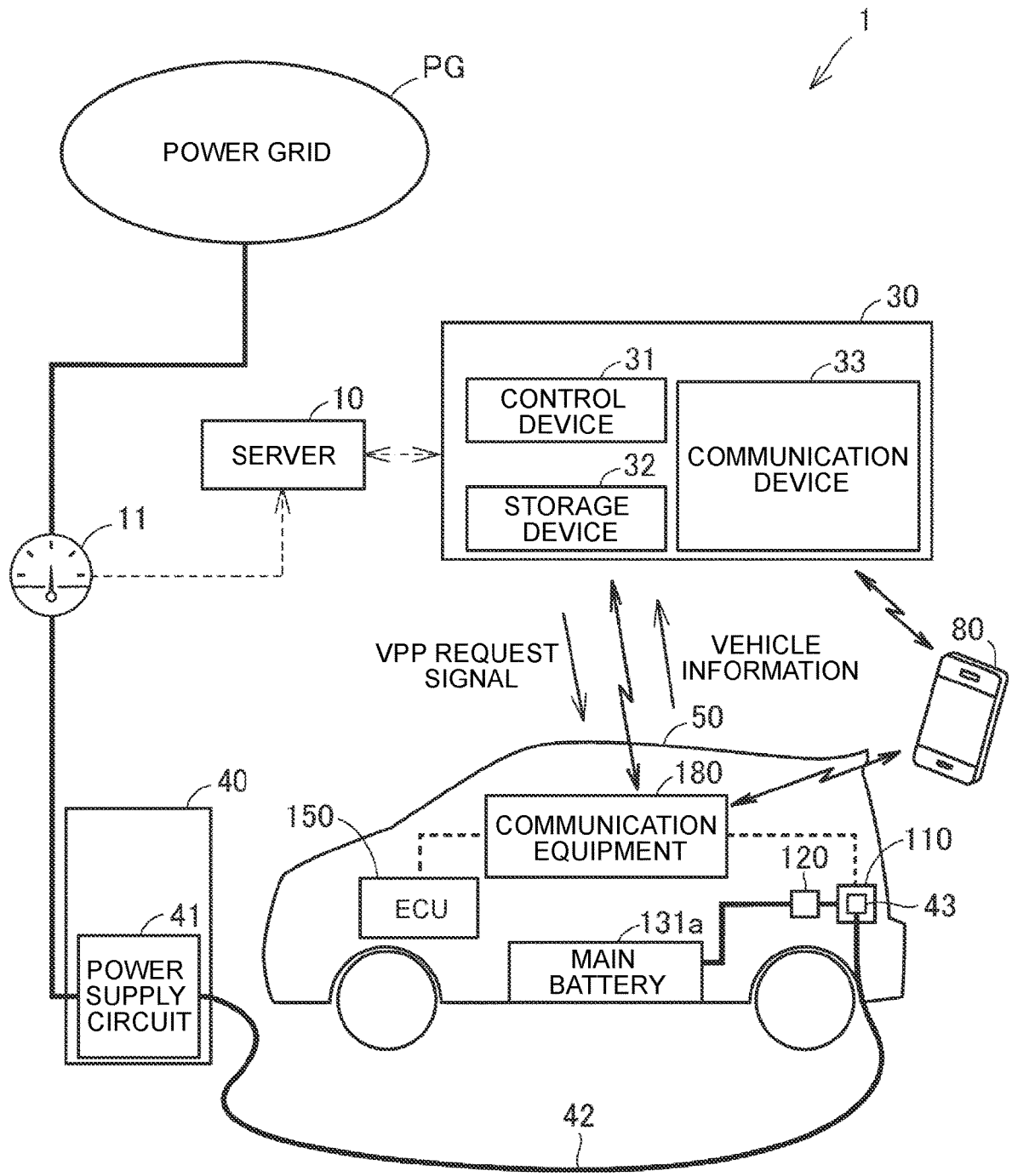
FIG. 3 shows a configuration of a power system including the vehicle shown in FIG. 1.

FIG. 3 shows a configuration of a power system according to the present embodiment. A power system 1 shown in FIG. 3 is a vehicle grid integration (VGI) system. The power system 1 functions as a virtual power plant (VPP). The VPP aggregates a large number of distributed energy resources (DERs) by advanced energy management technology using the Internet of Things (IoT). The VPP is a mechanism that performs remote integrated control of the DERs to make the DERs function as if they were a single power plant. An example of the DERs is energy resources owned by customers (hereinafter also referred to as "demand-side resources (DSRs)"). In the power system 1, the DSR for implementing the VPP is the vehicle 50 (i.e., an electrified vehicle equipped with an energy storage device). For example, the vehicle 50 is a personally owned vehicle (POV). The EVSE 40 is non-public EVSE that can only be used by a specific user (for example, home EVSE). The vehicle 50 is not limited to the POV, and may be a Mobility as a Service (MaaS) vehicle. The MaaS vehicle is a vehicle managed by a MaaS provider. The EVSE 40 may be public EVSE that can be used by a large, unspecified number of users.

In the present embodiment, a power grid PG, a server 10, the server 30, a smart meter 11, a plurality of pieces of EVSE (only the EVSE 40 is shown), and a plurality of DSRs (only the vehicle 50 is shown) form the power system 1. The numbers of electrified vehicles and pieces of EVSE included in the power system 1 are independent of each other and can be determined as desired. The power system 1 may include 10 or more electrically powered vehicles and 10 or more pieces of EVSE, or may include 100 or more electrically powered vehicles and 100 or more pieces of EVSE.

A mobile terminal 80 is a mobile terminal carried by the user of the vehicle 50. In the present embodiment, each mobile terminal 80 is a smartphone with a touch panel display. However, each mobile terminal 80 is not limited to a smartphone with a touch panel display and may be any mobile terminal. For example, each mobile terminal 80 may be a tablet, a wearable device (for example, a smart watch), or an electronic key.

The vehicle 50 shown in FIG. 3 is electrically connected to the EVSE 40. When the connector 43 of the charging cable 42 connected to the EVSE 40 is connected to the inlet 110 of the vehicle 50, the vehicle 50 and the EVSE 40 can communicate with each other, and electric power can also be transferred between the EVSE 40 and the vehicle 50. The vehicle 50 is thus ready for external charging and external power feeding. The communication equipment 180 mounted on the vehicle 50 is configured to communicate with the EVSE 40 via the charging cable 42. The EVSE 40 and the vehicle 50 may communicate with each other by any communication method. For example, the EVSE 40 and the vehicle 50 may communicate with each other by a controller area network (CAN) or power line communication (PLC).

The built-in power supply circuit 41 in the EVSE 40 is electrically connected to the power grid PG via the smart meter 11. For example, the main battery 131a is externally charged when electric power is supplied from the power grid PG to the vehicle 50 via the power supply circuit 41 and the charging cable 42. The vehicle 50 performs external power feeding to the EVSE 40 when electric power can be reversely supplied from the vehicle 50 to the power grid PG via the charging cable 42 and the power supply circuit 41. The power supply circuit 41 converts the electric power supplied from the power grid PG to electric power suitable for external charging. The power supply circuit 41 also converts the electric power supplied from the vehicle 50 to electric power suitable for reverse power flow.

The smart meter 11 is configured to measure the amount of power supplied from the EVSE 40 to the vehicle 50. The smart meter 11 is also configured to measure the amount of power reversely supplied from the vehicle 50 to the EVSE 40. The smart meter 11 is configured to measure power usage at predetermined time intervals (for example, every 30 minutes), store the measured power usage therein, and send the measured power usage to the server 10. The server 10 sends the measured value of the smart meter 11 to the server 30 as needed. The server 10 may send the measured value of the smart meter 11 to the server 30 either periodically or as requested by the server 30.

The communication equipment 180 mounted on the vehicle 50 is configured to wirelessly communicate with the server 30. Signals that are transferred between the communication equipment 180 and the server 30 may be encrypted. In the present embodiment, the communication equipment 180 mounted on the vehicle 50 and the mobile terminal 80 are configured to wirelessly communicate with each other. The ECU 150 can control the mobile terminal 80 by wireless communication to cause the mobile terminal 80 to give notifications to the user. The communication between the communication equipment 180 and the mobile terminal 80 may be short-range communication (e.g., direct communication both inside and around the vehicle) such as Bluetooth (registered trademark).

The mobile terminal 80 has predetermined application software (hereinafter simply referred to as the "app") installed therein. The mobile terminal 80 is carried by the user of the vehicle 50 and can send and receive information to and from the server 30 via the app. The user can operate the app via the touch panel display (not shown) of the mobile terminal 80. The touch panel display of the mobile terminal 80 is configured to be able to give notifications to the user of the vehicle 50.

The server 10 is a server that belongs to a power transmission and distribution business operator. In the present embodiment, an electric power company serves as both a power producer and a power transmission and distribution business operator. Power plants and power transmission and distribution facilities, both not shown, constitute a power network (i.e., the power grid PG). The power transmission and distribution facilities include transmission lines, substations, and distribution lines, and are configured to transmit and distribute electric power supplied from the power plants. In the present embodiment, the power grid PG includes variable renewable energy sources as the power plants. The variable renewable energy sources constituting the power grid PG are power sources whose power output fluctuates depending on weather conditions. The variable renewable energy sources supply generated electric power to the power transmission and distribution facilities of the power grid PG. The electric power generated by the variable renewable energy sources is variable renewable energy (VRE). In the present embodiment, the variable renewable energy sources are photovoltaic power generation facilities. However, the variable renewable energy sources are not limited to the photovoltaic power generation facilities, and may be wind power generation facilities. The power grid PG may further include at least one of the following types of power plants: thermal power plants, hydroelectric power plants, and nuclear power plants.

The electric power company maintains and manages the server 10, the smart meter 11, and the power grid PG. The electric power company can make a profit by, for example, doing business with customers who use electric power (for example, individuals or companies). The EVSE 40 is connected to the power grid PG via the smart meter 11. In the present embodiment, the electric power company is a grid operator who runs the power grid PG. The power grid PG according to the present embodiment is an example of the "power network" according to the present disclosure.

An electric utility that aggregates the DERs and provides energy management services is called an "aggregator." The electric power company can work with, for example, the aggregator to perform power adjustment (e.g., balance supply and demand) of the power grid PG. The electric power company or the aggregator makes a request for power adjustment of the power grid PG to each customer, and each customer performs power adjustment of the power grid PG in response to the request. This mechanism is generally referred to as demand response (DR). Hereinafter, the request for power adjustment of the power grid PG is also referred to as the "VPP request." The VPP request according to the present embodiment is one of the following requests: a request for an increase in power demand, a request for a reduction in power demand, and a request for reverse power flow.

Each of the server 10 and the server 30 is an example of the "management computer" that manages the power grid PG. The server 30 is a server that belongs to the aggregator. An automaker may also serve as the aggregator. Automakers can easily obtain information on vehicles they manufactured. Each vehicle included in the power system 1 is registered in the server 30. Each vehicle sequentially sends information on the vehicle (for example, the position of the vehicle, the connection state of the charging cable, and the amount of stored power of the vehicle) to the server 30. The server 30 includes a control device 31, a storage device 32, and a communication device 33. The control device 31 may be a computer. The control device 31 includes a processor, and is configured to perform predetermined information processing and control the communication device 33. The storage device 32 is configured to save various kinds of information. The communication device 33 includes various communication I/Fs. The control device 31 is configured to communicate with the outside through the communication device 33.

The server 30 is configured to be able to communicate with the server 10, the vehicle 50, and the mobile terminal 80. In the present embodiment, the aggregator's terminal (server 30) is configured to be able to communicate with the electric power company's terminal (server 10) and the vehicle user's terminal (communication equipment 180 and mobile terminal 80). However, the present disclosure is not limited to this, and the power system 1 may separately include a server that contacts the electric power company and a server that contacts the vehicle user. These servers may be managed by different electric utilities (for example, upper and lower aggregators).

When the server 10 performs power adjustment, the server 10 first selects the number of aggregators required for the power adjustment from a plurality of aggregators. The server 10 makes a VPP request to the selected aggregator(s). The server 30 selects the number of VPP cooperating vehicles required to respond to the VPP request of the server 10. The VPP cooperating vehicles refer to vehicles that participate in the VPP (requested power adjustment). The VPP cooperating vehicles are selected from a plurality of vehicles (including the vehicle 50) that belong to the users who signed a contract with the aggregator in advance. Those users who signed this contract can receive a predetermined incentive by performing charging or discharging according to the request from the aggregator. Those user who agreed to respond to the request but failed to do so will be penalized as prescribed by the above contract.

In the present embodiment, when the selection of the VPP cooperating vehicles is finished, the server 30 determines a charge and discharge schedule of each VPP cooperating vehicle. The server 30 then sends a VPP request signal to the user of each VPP cooperating vehicle. The VPP request signal includes: the type of requested power adjustment (more specifically, increased charging, reduced charging, or discharging); the content of the requested power adjustment (for example, a required power value for increased charging, an allowable power value for reduced charging, or a required power value for discharging); and a VPP request period (more specifically, the start and end times of the requested power adjustment). The server 30 requests the user of each VPP cooperating vehicle to perform increased charging, reduced charging, or discharging according to the power adjustment requested by the server 10 (that is, an increase in power demand, a decrease in power demand, or reverse power flow). The VPP request signal according to the present embodiment requests the user of the VPP cooperating vehicle to get the VPP cooperating vehicle ready so that the server 30 can perform charge and discharge control of the VPP cooperating vehicle by remote control during the VPP request period. The VPP request signal is an example of the "request signal" according to the present disclosure.

In the present embodiment, the type and content of power adjustment included in the VPP request signal are an example of the "supply and demand information of the power grid" according to the present disclosure. When the requested power adjustment is increased charging, it means that the power grid PG is oversupplied. When the requested power adjustment is reduced charging or discharging, it means that the power grid PG is undersupplied.

When the start time of the VPP request period set for the VPP cooperating vehicle comes, the server 30 performs the power adjustment requested by the server 10 by sending a charge and discharge command (more specifically, a command to cause the VPP cooperating vehicle to perform charge and discharge control) to the VPP cooperating vehicle.

The server 30 measures the amount of power adjustment of each VPP cooperating vehicle with a predetermined electricity meter. The predetermined electricity meter may be the smart meter 11 or an electricity meter mounted on the vehicle 50 (for example, the sensor MD 132). The electricity meter may be mounted at any location. The EVSE 40 may have a built-in electricity meter. The electricity meter may be attached to a portable charging cable.

In the present embodiment, the server 30 and the EVSE 40 do not communicate with each other. However, the server 30 and the EVSE 40 may be configured to communicate with each other. The server 30 may be configured to communicate with the vehicle 50 via the EVSE 40. The EVSE 40 may be configured to be able to communicate with an EVSE management cloud. The communication protocol between the EVSE 40 and the EVSE management cloud may be the Open Charge Point Protocol (OCPP).

Figure 4:
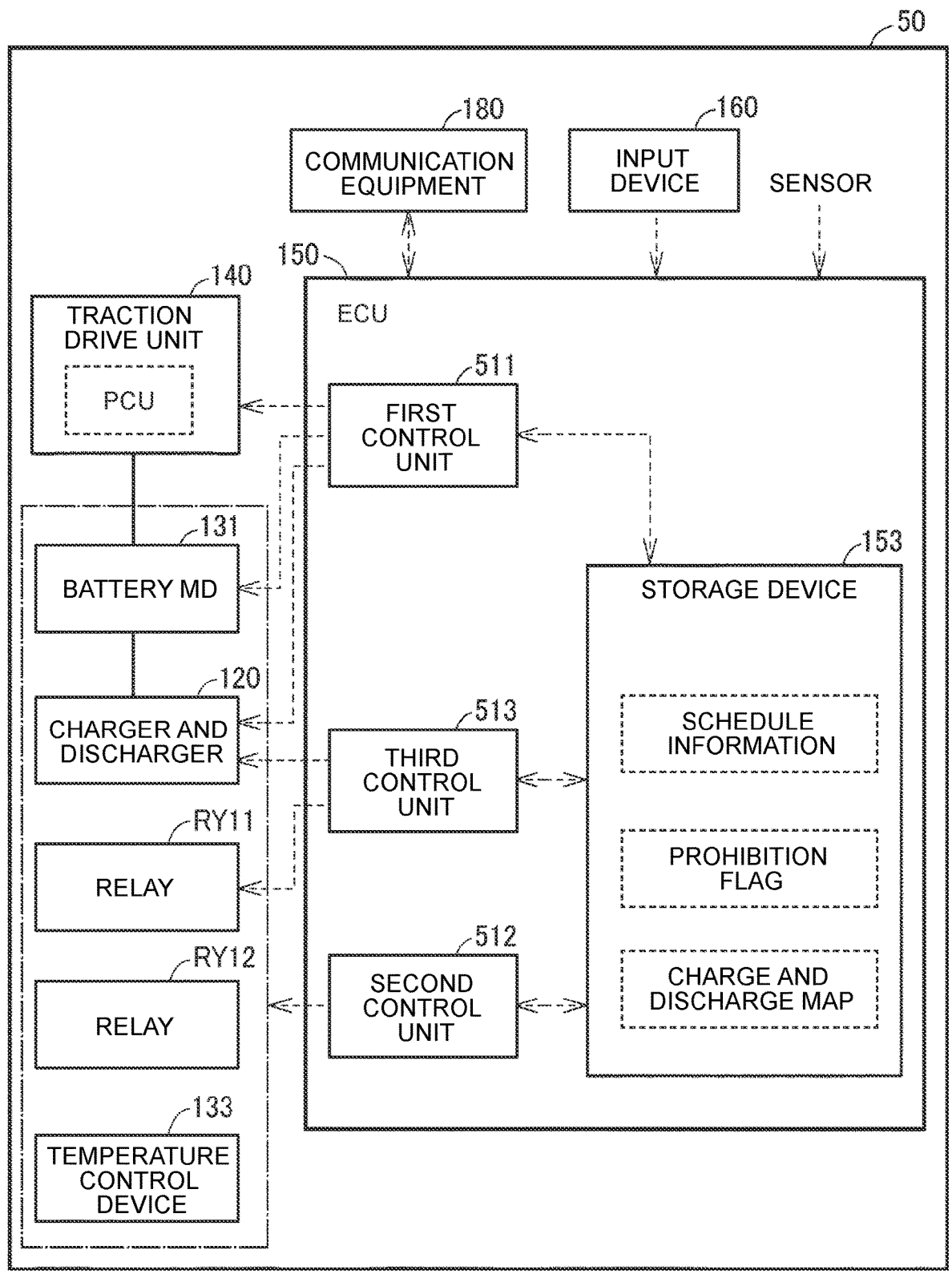
FIG. 4 shows a detailed configuration of a control device mounted on the vehicle shown in FIG. 1.

FIG. 4 shows a detailed configuration of the ECU 150 of the vehicle 50. Referring to FIGS. 1 to 4, the ECU 150 includes a first control unit 511, a second control unit 512, and a third control unit 513. In the present embodiment, the first control unit 511, the second control unit 512, and the third control unit 513 are an example of the "first control device," the "second control device," and the "third control device" according to the present disclosure, respectively. In the ECU 150 according to the present embodiment, the units mentioned above are embodied by the processor 151 shown in FIG. 1 and a program that is executed by the processor 151 (for example, the program stored in the storage device 153). However, these units are not necessarily embodied by the processor 151 and the program, and may be embodied by dedicated hardware (electronic circuit).

The detected values of various sensors mounted on the vehicle 50 are input to the ECU 150. In addition to the sensor MD 132, the vehicle 50 is also equipped with, for example, a position sensor, a vehicle speed sensor, an accelerator sensor, an outside air temperature sensor, and a charging cable connection detection circuit that are not shown in the figures. The ECU 150 uses the detected values of these sensors for control as necessary. The ECU 150 sequentially sends the state of the vehicle 50 (including, for example, the connection state of the charging cable 42 and the SOCs of the main battery 131$a$ and the sub-battery 131$b$) to the server 30. For example, the server 30 remotely controls the vehicle 50 during the VPP request period while referring to information received from the vehicle 50.

The first control unit 511 is configured to perform charge and discharge control of the main battery 131$a$. The first control unit 511 is configured to limit the electric power that is input to the main battery 131$a$ to a predetermined value (hereinafter referred to as "W-in") or less. The first control unit 511 controls the charger and discharger 120 and the traction drive unit 140 so that electric power larger than W-in will not be input to the main battery 131$a$. The first control unit 511 is also configured to limit the electric power that is output from the main battery 131$a$ to a predetermined value (hereinafter referred to as "W-out") or less. The first control unit 511 controls the charger and discharger 120 and the traction drive unit 140 so that electric power larger than W-out will not be output from the main battery 131$a$. For example, W-in and W-out are set for the purpose of protecting the main battery 131$a$. W-in indicates the power that can be input to the main battery 131$a$ (that is, the maximum value of the input power), and W-out indicates the power that can be output from the main battery 131$a$ (that is, the maximum value of the output power).

Figure 5:
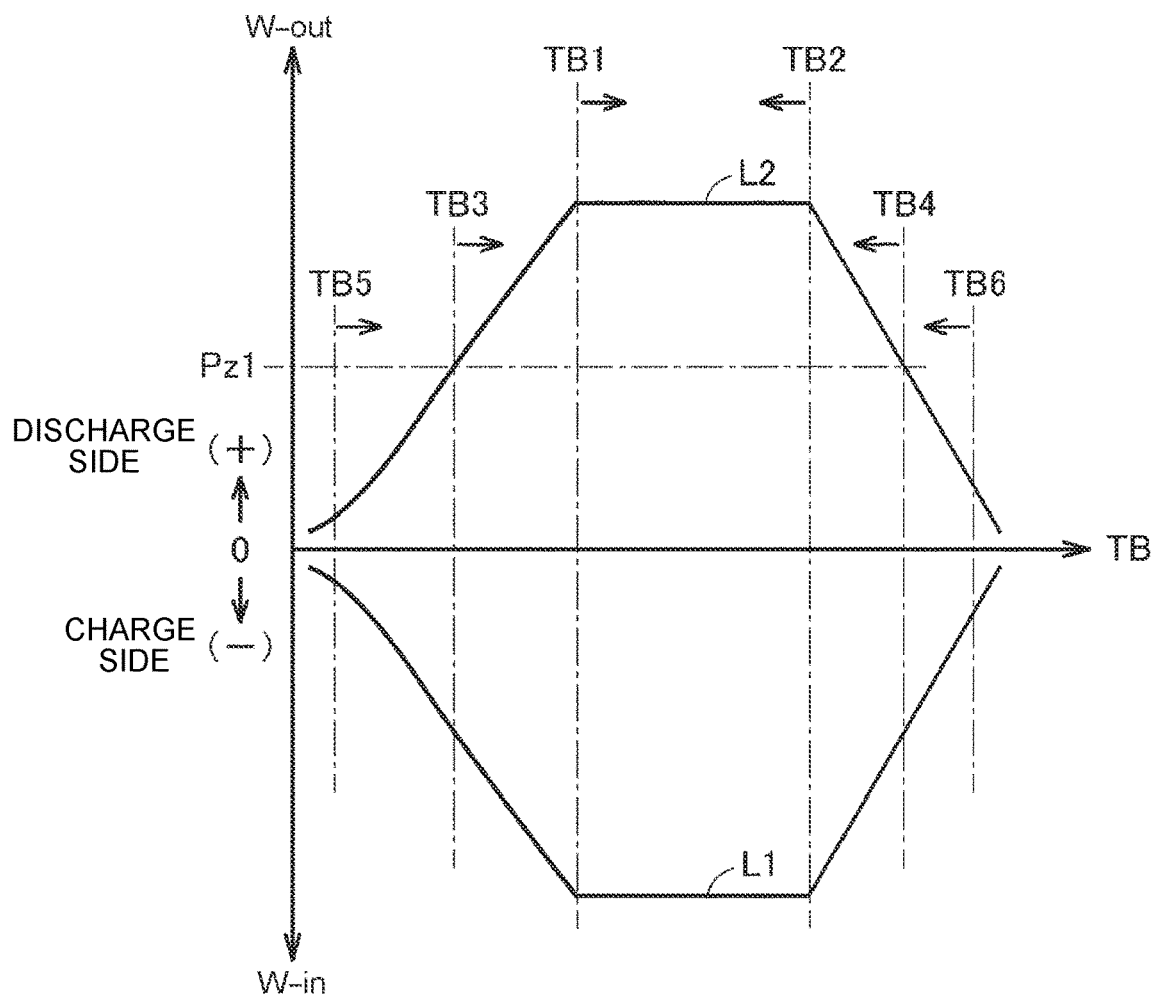
FIG. 5 shows an example of a charge and discharge map that is used in the vehicle shown in FIG. 1.

W-in and W-out change according to, for example, a charge and discharge map stored in the storage device 153. FIG. 5 shows an example of the charge and discharge map. In FIG. 5, the abscissa represents the temperature of the main battery 131$a$ (hereinafter referred to as the "temperature TB"). TB1 to TB6 in FIG. 5 indicate the values of the temperature TB. The ordinate represents the magnitudes of W-in and W-out. In the present embodiment, the power on the discharge side is expressed as positive (+), and the power on the charge side is expressed as negative (—). However, when comparing the magnitudes of power values, their absolute values are used regardless of the sign (+, −).

Referring to FIG. 5, W-in (see line L1) and W-out (see line L2) change according to the temperature TB. In the example shown in FIG. 5, the change of W-in according to the temperature TB is similar to the change of W-out according to the temperature TB. Specifically, the power value is maximum in the temperature region of TB1 or more and TB2 or less. In a low temperature region lower than TB1, the power value increases with an increase in temperature TB. In a high temperature region higher than TB2, the power value decreases with an increase in temperature TB. TB3 to TB6 in FIG. 5 will be described later.

Referring back to FIGS. 1 to 4, the first control unit 511 is configured to control the DC-to-DC converter 131$c$ shown in FIG. 2. The first control unit 511 charges the sub-battery 131$b$ with the power of the main battery 131$a$ so that the SOC of the sub-battery 131$b$ will not decrease too much. The input and output power of the sub-battery 131$b$ may also be limited by a method similar to that described above for the main battery 131$a$ (the method using W-in and W-out).

In the present embodiment, increased charging, reduced charging, or discharging of the main battery 131$a$ together with start time (hereinafter referred to as "time ts") is scheduled in the first control unit 511. When the vehicle 50 receives the VPP request signal, increased charging, reduced charging, or discharging of the main battery 131$a$ is scheduled in the first control unit 511 as requested by the VPP request signal. The schedule information is stored in the storage device 153. The start time of the VPP request period specified by the VPP request signal is set in the first control unit 511 as the time ts. The set time ts is stored in the storage device 153. In the present embodiment, when the vehicle 50 is selected as a VPP cooperating vehicle, the VPP request signal is sent from the server 30 to the mobile terminal 80. The user of the vehicle 50 can check the content of the request and decide whether to accept the request. When the user of the vehicle 50 inputs acceptance of the request on the mobile terminal 80, the mobile terminal 80 notifies the server 30 of the acceptance of the request and sends the VPP request signal to the communication equipment 180. On the other hand, when the user of the vehicle 50 inputs the refusal of the request on the mobile terminal 80, the mobile terminal 80 notifies the server 30 of the refusal of the request. When notified of the refusal of the request, the server 30 cancels the selection of the vehicle 50 and selects another VPP cooperating vehicle instead of the vehicle 50. However, the present disclosure is not limited to the above configuration, and the server 30 may be configured to send the VPP request signal directly to the communication equipment 180 of the vehicle 50.

When the time ts comes after the scheduling is finished, the first control unit 511 starts the scheduled increased charging, reduced charging, or discharging of the main battery 131$a$. Hereinafter, the increased charging, reduced charging, or discharging that is performed by the first control unit 511 will be described with reference to FIGS. 6 to 8.

Figure 6:
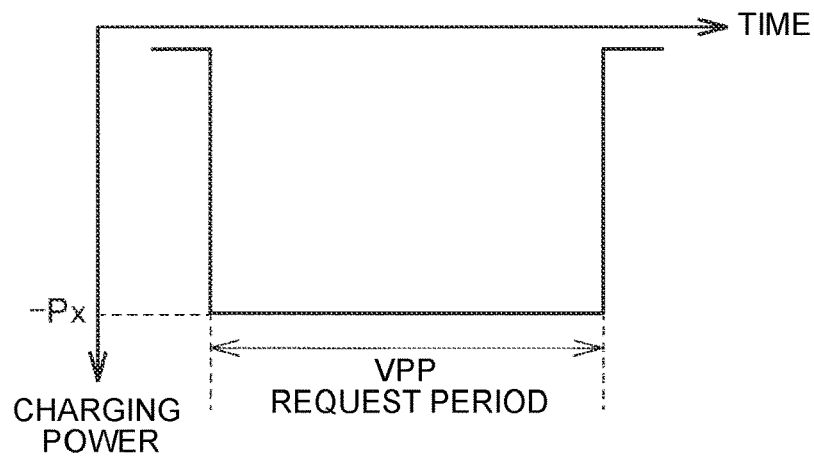
FIG. 6 illustrates increased charging that is scheduled for the vehicle shown in FIG. 1.

FIG. 6 is a figure to describe the scheduled increased charging. Referring to FIG. 6, the increased charging scheduled in the first control unit 511 is, for example, external charging with charging power equivalent to a required power value "−Px" (charging of the main battery 131$a$ using the power of the power grid PG).

Figure 7:
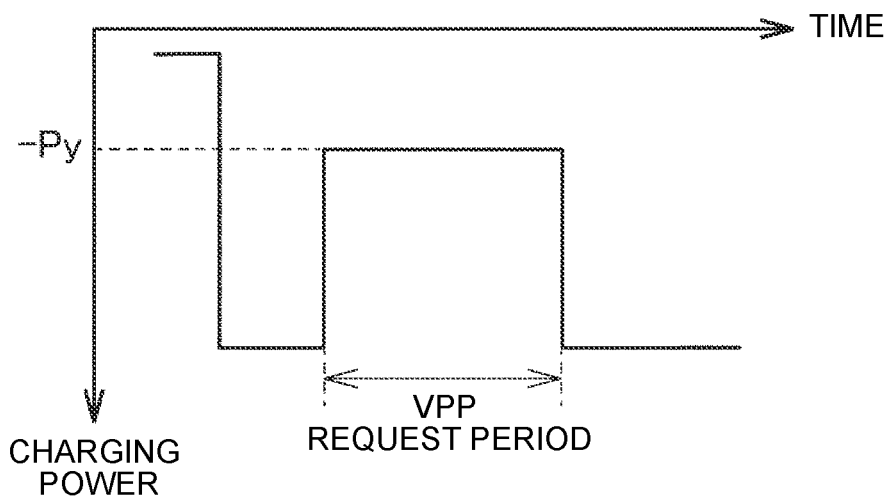
FIG. 7 illustrates reduced charging that is scheduled for the vehicle shown in FIG. 1.

FIG. 7 is a figure to describe the scheduled reduced charging. Referring to FIG. 7, the reduced charging scheduled in the first control unit 511 is, for example, prohibiting external charging with charging power larger (larger on the negative side) than an allowable power value "—Py." However, external charging with charging power smaller than (closer to 0) the allowable power value "—Py" is allowed. External charging may not be performed during the VPP request period of the reduced charging.

Figure 8:
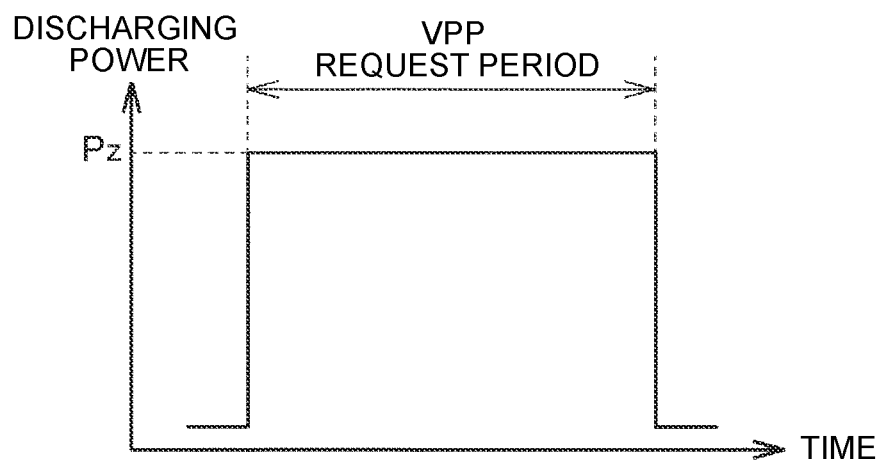
FIG. 8 illustrates discharge that is scheduled for the vehicle shown in FIG. 1.

FIG. 8 is a figure to describe the scheduled discharging. Referring to FIG. 8, the discharging scheduled in the first control unit 511 is, for example, external power feeding with discharge power equivalent to a required power value "Pz" (discharging from the main battery 131a to the power grid PG).

Referring back to FIGS. 1 to 4, the first control unit 511 starts the scheduled increased charging (see, e.g., FIG. 6), reduced charging (see, e.g., FIG. 7), or discharging (see, e.g., FIG. 8) at the time ts (start time of the VPP request period) and continues the scheduled increased charging, reduced charging, or discharging until the end time of the VPP request period (hereinafter referred to as "time te"). In the present embodiment, the first control unit 511 controls charging and discharging of the main battery 131a during the VPP request period according to a charge and discharge command that is sent from the server 30 to the vehicle 50.

The second control unit 512 controls the temperature control device 133 to perform the temperature control of the main battery 131a. The second control unit 512 controls the temperature control device 133 so that the temperature of the main battery 131a will be within a desired temperature range at the time ts. How to set the desired temperature range will be described later (see FIG. 10).

The second control unit 512 is configured to select either external power or battery power and drive the temperature control device 133 with the selected power. The second control unit 512 is configured to control the power conversion circuit 122, the relay RY11, and the relay RY12 shown in FIG. 2. The second control unit 512 can drive the temperature control device 133 using the external power (for example, the power of the power grid PG) by closing the relay RY11 when the relay 121 is open. The second control unit 512 can drive the temperature control device 133 using the battery power (power of the main battery 131a and the sub-battery 131b) by closing the relay RY12 when the relay 121 and the relay RY11 are open. As will be described below, however, the second control unit 512 cannot drive the temperature control device 133 using the external power when supply of the external power is prohibited.

The third control unit 513 switches between permission and prohibition of supply of the external power (that is, supply of power from the power grid PG to the vehicle 50). In the present embodiment, the third control unit 513 switches between permission and prohibition of supply of the external power according to the value (ON or OFF) of a prohibition flag stored in the storage device 153. Specifically, the third control unit 513 is configured to control the relay 121 and the relay RY11 shown in FIG. 2. When the prohibition flag is ON, the third control unit 513 keeps both the relay 121 and the relay RY11 open (disconnected). Supply of the external power is thus prohibited. In the present embodiment, the control by the third control unit 513 is prioritized over the control by the first control unit 511 and the control by the second control unit 512. Therefore, the first control unit 511 cannot close the relay 121 when the prohibition flag is ON. The second control unit 512 also cannot close the relay RY11 when the prohibition flag is ON. On the other hand, the third control unit 513 does not restrict the relay 121 and the relay RY11 from being closed when the prohibition flag is OFF. Supply of the external power is thus permitted.

Figure 9:
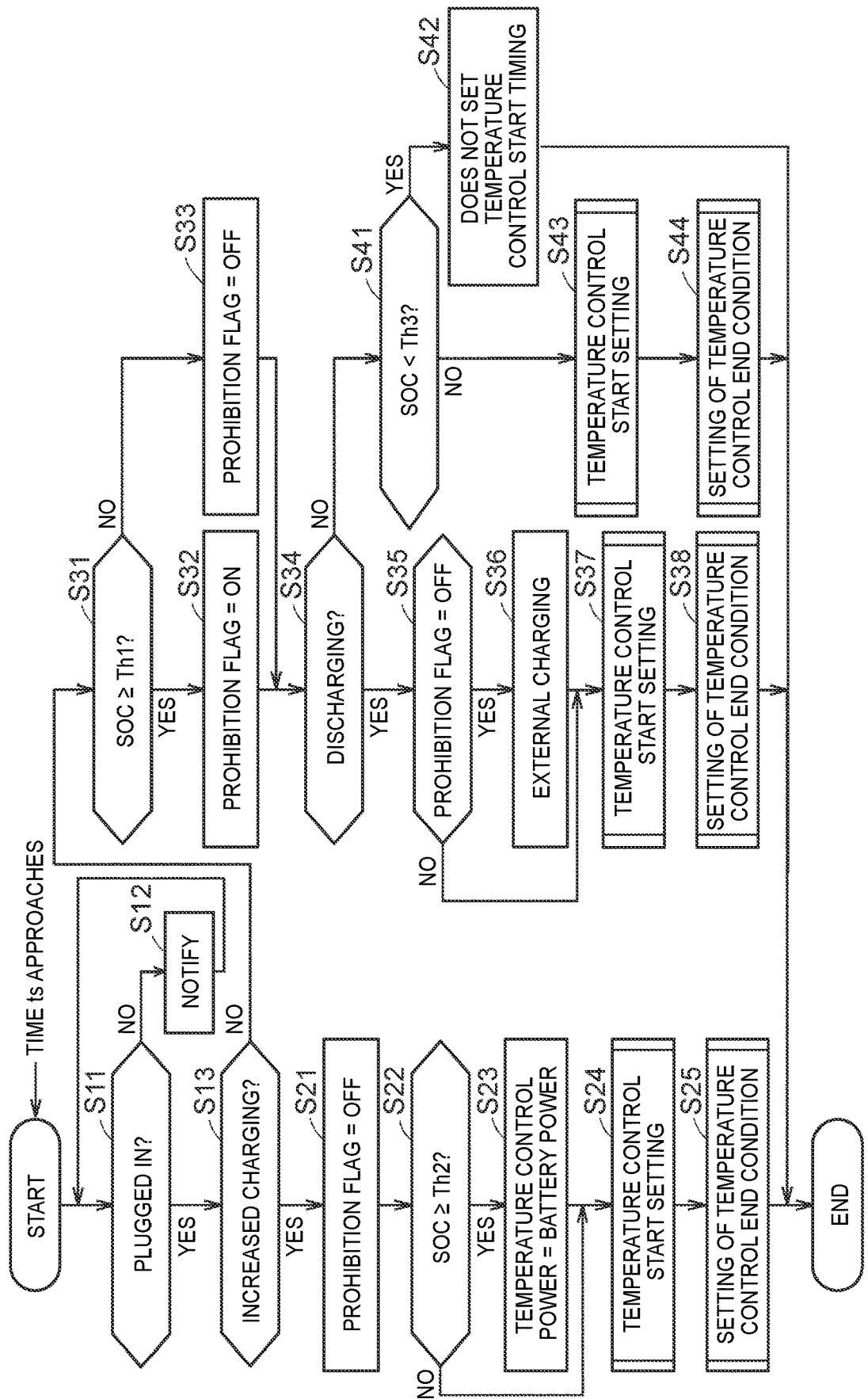
FIG. 9 is a flowchart of a process related to determination of the necessity of temperature control and setting of a temperature control condition in an energy management method according to the embodiment of the present disclosure.

Hereinafter, the temperature control of the main battery 131a may be simply referred to as "temperature control." FIG. 9 is a flowchart illustrating a process related to determination of the necessity of temperature control and setting of a temperature control condition. The process shown in this flowchart is started at a timing that goes back a predetermined period of time (for example, about 1 to 3 hours) back from the time ts. That is, the series of steps shown in FIG. 9 is started when the time ts set in the first control unit 511 approaches. When the vehicle 50 receives the VPP request signal at a time close to the time ts (start time of the VPP request period), the series of steps shown in FIG. 9 is started at the same time the vehicle 50 receives the VPP request signal. Hereinafter, each step in the flowchart is denoted by a step number that starts with the letter "S."

Referring to FIG. 9 together with FIGS. 1 to 3, the ECU 150 determines in S11 whether the vehicle 50 has been plugged in (more specifically, the EVSE 40 and the vehicle 50 are electrically connected). When the vehicle 50 has not been plugged in (NO in S11), the ECU 150 causes the notification device 170 or the mobile terminal 80 to give a notification prompting the user of the vehicle 50 to plug in the vehicle 50 in S12. S11 and S12 are repeated until the vehicle 50 is plugged in.

When the vehicle 50 has been plugged in (YES in S11), the third control unit 513 determines in S13 whether the power adjustment requested by the VPP request signal is increased charging. When increased charging is requested (YES in S13), the process proceeds to S21. When YES in S13, it means that the supply and demand situation indicated by the VPP request signal is oversupply. When the VPP request signal requests increased charging, increased charging of the main battery 131a is scheduled in the first control unit 511. On the other hand, when reduced charging or discharging is requested (NO in S13), the process proceeds to S31. When NO in S13, it means that the supply and demand situation indicated by the VPP request signal is undersupply.

In S21, the third control unit 513 sets the prohibition flag to OFF. Supply of the external power is thus permitted. In the subsequent step S22, the second control unit 512 determines whether the SOC of the main battery 131a is equal to or higher than a predetermined second threshold (hereinafter referred to as "Th2"). When the second control unit 512 determines in S22 that the SOC of the main battery 131a is equal to or higher than Th2 (YES in S22), the second control unit 512 sets the battery power as temperature control power (that is, power to be used to drive the temperature control device 133 for temperature control) in S23. The temperature control condition is stored in the storage device 153. The process then proceeds to S24. When NO in S22, the process also proceeds to S24.

In S24, the necessity of temperature control is determined (and the temperature control start timing is set, as necessary). A temperature control end condition is set in the subsequent step S25. The series of steps shown in FIG. 9 ends after S25. S24 and S25 will be described later.

In S31, the third control unit 513 determines whether the amount of the stored power of the vehicle 50 is equal to or larger than a predetermined first threshold (hereinafter referred to as "Th1"). In the present embodiment, the SOC of the main battery 131a (the energy storage device with the largest capacity) is used as the amount of the stored power of the vehicle 50. However, the amount of the stored power of the vehicle 50 is not limited to the SOC of the main battery 131a, and the total amount of power stored in the main battery 131a and the sub-battery 131b may be used as the amount of the stored power of the vehicle 50.

When the third control unit 513 determines in S31 that the SOC of the main battery 131a is equal to or higher than Th1 (YES in S31), the third control unit 513 sets the prohibition flag in S32 to ON. Supply of the external power is thus prohibited. On the other hand, when NO in S31, the third control unit 513 sets the prohibition flag to OFF in S33. Supply of the external power is thus permitted. After either S32 or S33 is performed, the process proceeds to S34.

In S34, the first control unit 511 determines whether the power adjustment requested by the VPP request signal is discharging. When discharging is requested (YES in S34), the process proceeds to S35. When the VPP request signal requests discharging, discharging of the main battery 131a is scheduled in the first control unit 511. On the other hand, when reduced charging is requested (NO in S34), the process proceeds to S41. When the VPP request signal requests reduced charging, reduced charging of the main battery 131a is scheduled in the first control unit 511.

In S35, the first control unit 511 determines whether the prohibition flag is OFF. When the prohibition flag is OFF (YES in S35), the first control unit 511 performs external charging of the main battery 131a in S36 so that the amount of the stored power of the vehicle 50 (in the present embodiment, the SOC of the main battery 131a) becomes equal to or larger than a predetermined value. The predetermined value may be the same as Th1, or may be a value higher than Th1. When the external charging is finished, the process proceeds to S37. When NO in S35, the process also proceeds to S37.

In S37, the necessity of temperature control is determined (and the temperature control start timing is set, as necessary). A temperature control end condition is set in the subsequent step S38. The series of steps shown in FIG. 9 ends after S38. S37 and S38 will be described later.

In S41, the second control unit 512 determines whether the amount of the stored power of the vehicle 50 (in the present embodiment, the SOC of the main battery 131a) is smaller than a predetermined third threshold (hereinafter referred to as "Th3"). When the second control unit 512 determines in S41 that the SOC of the main battery 131a is lower than Th3 (YES in S41), the temperature control start timing is not set (S42), and the series of steps shown in FIG. 9 ends. Accordingly, the temperature control device 133 will not be driven before the time ts. When YES in S41, it means that the second control unit 512 determines that temperature control is not necessary.

When NO in S41, the process proceeds to S43. In S43, the necessity of temperature control is determined (and the temperature control start timing is set, as necessary). A temperature control end condition is set in the subsequent step S44. The series of steps shown in FIG. 9 ends after S44. S43 and S44 will be described later.

Figure 10:
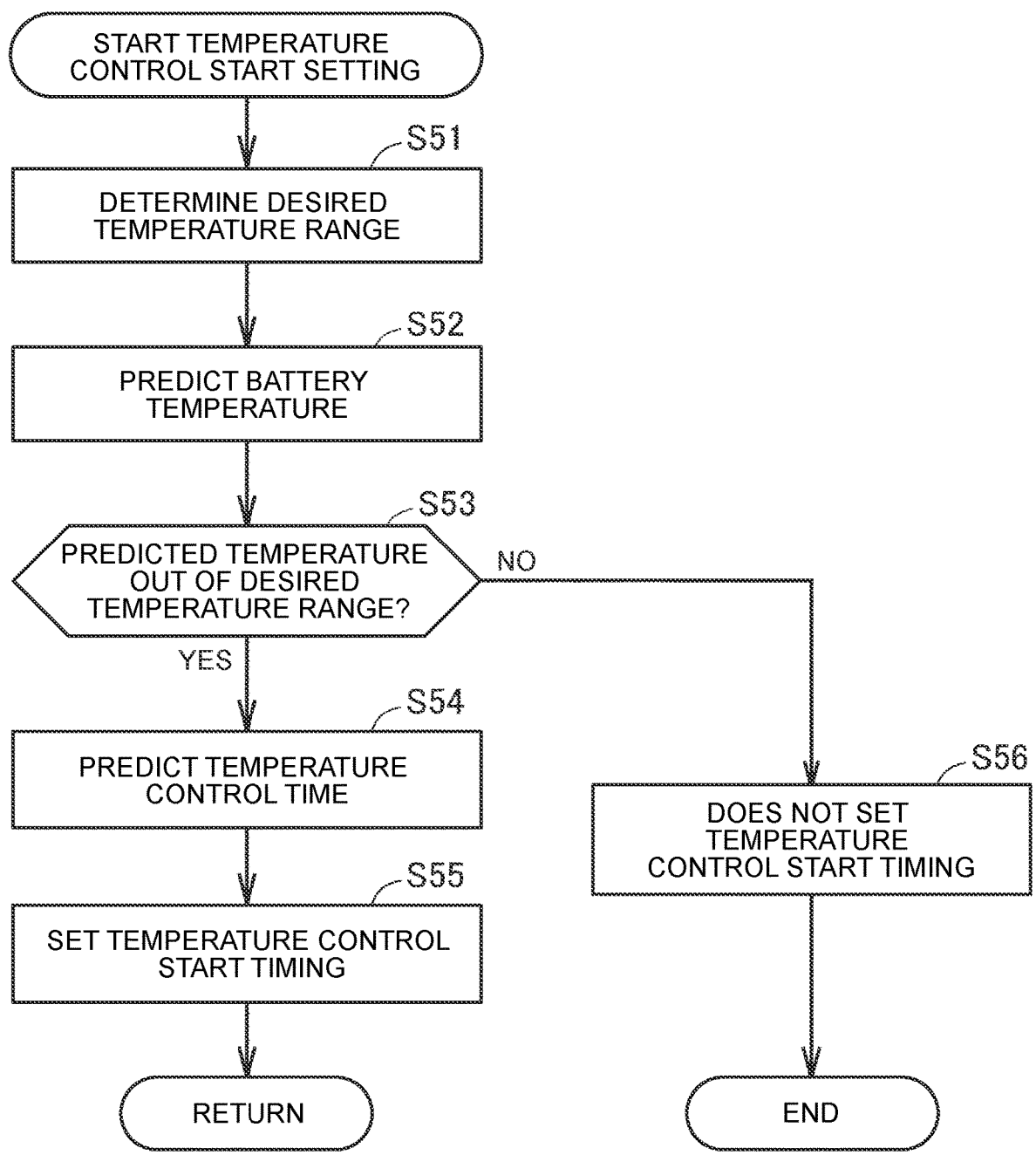
FIG. 10 is a flowchart illustrating a process related to temperature control start setting shown in FIG. 9.

FIG. 10 is a flowchart illustrating a process related to the determination of the necessity of temperature control and the setting of the temperature control start timing in S24, S37, and S43 of FIG. 9.

Referring to FIG. 10 together with FIGS. 1 to 3, in S51, the second control unit 512 determines a desired temperature range based on the VPP request signal. Hereinafter, how to determine the desired temperature range in the present embodiment will be described with reference to FIG. 5.

Referring to FIG. 5 together with FIGS. 1 to 3, when the VPP request signal requests increased charging, the second control unit 512 sets the desired temperature range to the temperature range of TB1 or more and TB2 or less. Since the desired temperature range is set to the temperature range of TB1 or more and TB2 or less, the power values of W-in and W-out are maximum. When the VPP request signal requests discharging, the second control unit 512 changes the desired temperature range according to the required power value. For example, when the required power value for discharging is "Pz1" in FIG. 5, the second control unit 512 sets the desired temperature range to the temperature range of TB3 or more and TB4 or less in FIG. 5. The temperature range of TB3 or more and TB4 or less in FIG. 5 is a temperature range in which electric power equivalent to "Pz1" (or "Pz1" with a margin) can be output from the main battery 131a. When the VPP request signal requests reduced charging, the second control unit 512 sets the desired temperature range to a wider temperature range than when the VPP request signal requests increased charging or discharging (for example, the temperature range of TB5 or more and TB6 or less in FIG. 5). The temperature range of TB5 or more and TB6 or less in FIG. 5 may be a limit temperature range in which the main battery 131a will neither freeze nor overheat.

Referring back to FIG. 10 together with FIGS. 1 to 3, in the subsequent step S52, the second control unit 512 predicts the temperature TB (temperature of the main battery 131a) at the time ts on the assumption that the main battery 131a is left without the temperature control. Specifically, the second control unit 512 predicts the temperature TB at the time ts based on the current temperature TB (actual measured value), the outside air temperature (actual measured value or predicted value based on weather information), the current time, and the time ts. The second control unit 512 can predict how the temperature TB will change until the time ts, based on the degree of deviation between the current temperature TB and the outside air temperature and the time from the current time to the time ts. The relational expression (or map) that is used for this prediction is stored in advance in the storage device 153. The longer the time from the current time to the time ts, the more likely the temperature TB is to change. The larger the degree of deviation between the current temperature TB and the outside air temperature, the more likely the temperature TB is to change. When the main battery 131a is left without temperature control, the temperature TB tends to approach the outside air temperature (ambient temperature). A parameter indicating the degree of deviation is, for example, the difference or ratio between the current temperature TB and the outside air temperature. The larger the difference (absolute value) between the current temperature TB and the outside air temperature, the larger the degree of deviation therebetween. The closer the ratio between the current temperature TB and the outside air temperature is to 1, the smaller the degree of deviation therebetween.

The ECU 150 may sequentially record a change in state of the main battery 131a in the storage device 153. The second control unit 512 may predict the temperature TB at the time ts in view of history data of the temperature TB (for example, the most recent change in temperature TB). The second control unit 512 may consider the SOC of the main battery 131a for the prediction of the temperature TB. The tendency of the temperature of the main battery 131a to change may vary depending on the SOC of the main battery 131a.

In the subsequent step S53, the second control unit 512 determines whether the temperature TB at the time ts predicted as described above is out of the desired temperature range. When the second control unit 512 predicts that the temperature TB will be out of the desired temperature range at the time ts (YES in S53), the process proceeds to S54. When YES in S53, it means that the second control unit 512 determines that temperature control is necessary.

In S54, the second control unit 512 predicts the amount of time required for the temperature control device 133 to control the temperature TB to be within the desired temperature range (hereinafter also referred to as the "temperature control time"). The relational expression (or map) that is used for this prediction is stored in advance in the storage device 153. The second control unit 512 predicts the temperature control time using, for example, the current temperature TB (actual measured value) and the outside air temperature (actual measured value or predicted value based on weather information). The second control unit 512 may consider the SOC of the main battery 131a for the prediction of the temperature control time.

In the subsequent step S55, the second control unit 512 sets the temperature control start timing. The second control unit 512 sets the temperature control start timing to, for example, a timing that goes back the temperature control time (or temperature control time with a margin) back from the time ts. The series of steps shown in FIG. 10 ends after S55. The process then returns to S25, S38, or S44 of FIG. 9.

On the other hand, when the second control unit 512 predicts that the temperature TB will be within the desired temperature range at the time ts (NO in S53), the temperature control start timing is not set (S56), and the series of steps shown in FIG. 10 ends. In this case, the entire process ends without returning to the process of FIG. 9. Accordingly, the temperature control device 133 will not be driven before the time ts. When NO in S53, it means that the second control unit 512 determines that temperature control is not necessary.

Figure 11:
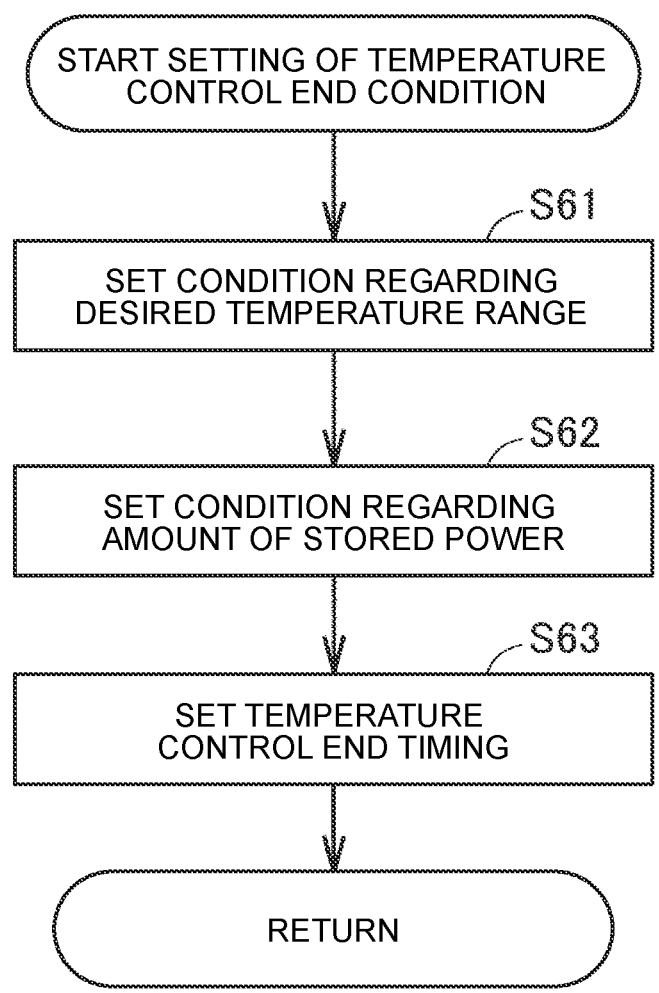
FIG. 11 is a flowchart illustrating a process related to setting of a temperature control end condition shown in FIG. 9.

FIG. 11 is a flowchart illustrating a process related to the setting of the temperature control end condition in S25, S38, and S44 of FIG. 9.

Referring to FIG. 11 together with FIGS. 1 to 3, in S61, the second control unit 512 sets a requirement of the temperature control end condition using the desired temperature range determined in S51 of FIG. 10. Specifically, the second control unit 512 sets a first requirement of the temperature control end condition that the temperature TB be within the desired temperature range.

In the subsequent step S62, the second control unit 512 sets a requirement regarding the amount of the stored power. However, this requirement can be omitted. In the present embodiment, the requirement regarding the amount of the stored power is set only in S25 of FIG. 9, and no requirement regarding the amount of the stored power is set in S38 and S44 of FIG. 9.

In S25 (increased charging) of FIG. 9, the second control unit 512 sets a second requirement of the temperature control end condition that the SOC of the main battery 131a be lower than Th2 (see S22 of FIG. 9). Accordingly, when the SOC of the main battery 131a is higher than Th2 before the time ts, the temperature control device 133 is driven by the battery power to bring the SOC of the main battery 131a closer to Th2. As the power of the main battery 131a is thus consumed by driving the temperature control device 133, the SOC of the main battery 131a (amount of the stored power) is reduced to a level low enough to perform the requested increased charging.

In the subsequent step S63, the second control unit 512 sets the temperature control end timing based on the VPP request signal. Specifically, the second control unit 512 sets a third requirement of the temperature control end condition that the time ts (start time of the VPP request period) have come.

The temperature control end condition is set by S61 to S63. For each of the increased charging, reduced charging, and discharging, the temperature control end condition is satisfied when the third requirement is met (that is, when the time ts has come). The temperature control end condition for the increased charging is satisfied not only when the third requirement is met but also when both the first and second requirements are met. The temperature control end condition for the reduced charging and the discharging is satisfied not only when the third requirement is met but also when the first requirement is met. The series of steps shown in FIG. 11 ends after S63.

Figure 12:
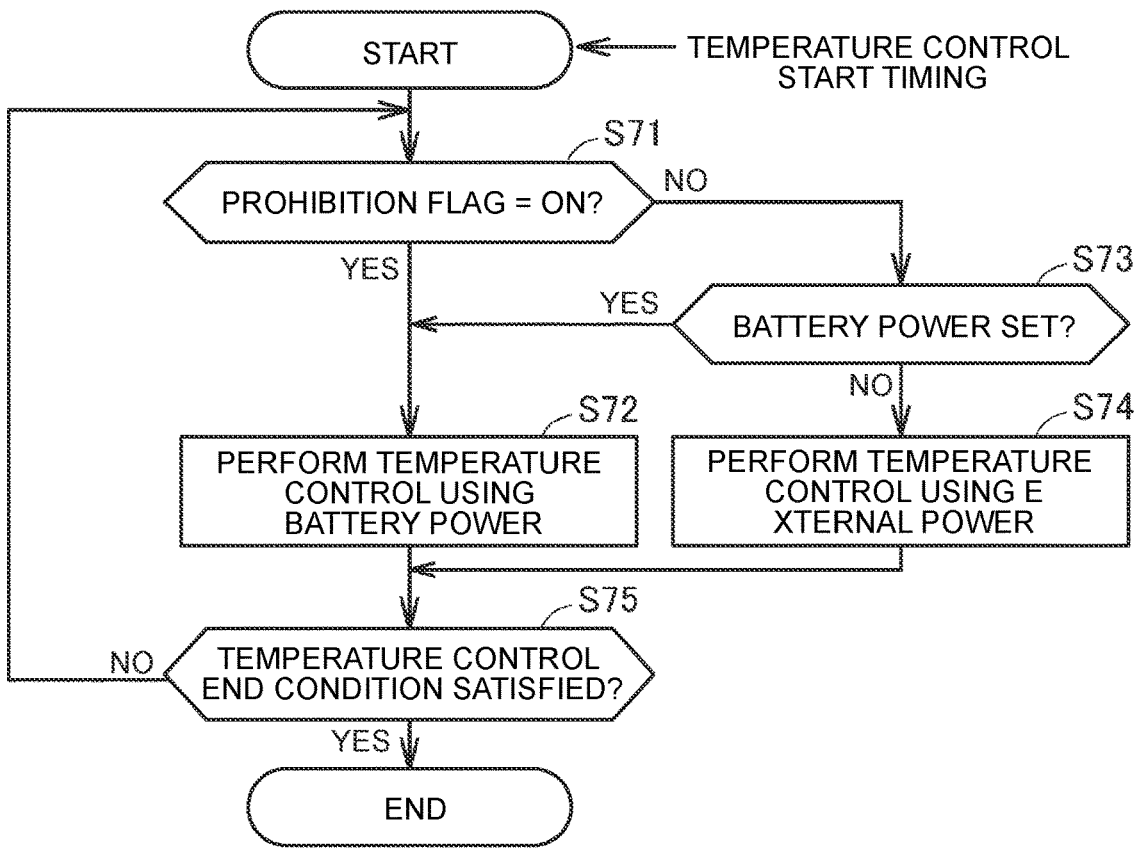
FIG. 12 is a flowchart of a process related to temperature control of an energy storage device in the energy management method according to the embodiment of the present disclosure.

FIG. 12 is a flowchart of a process related to temperature control (temperature control of the main battery 131a). The process shown in this flowchart is started when the temperature control start timing set in S55 of FIG. 10 comes. In the present embodiment, the temperature control start timing is set to immediately before the time ts.

Referring to FIG. 12 together with FIGS. 1 to 3, in S71, the second control unit 512 determines whether the prohibition flag is ON. When the prohibition flag is ON (YES in S71), the second control unit 512 drives the temperature control device 133 with the battery power to perform the temperature control of the main battery 131a in S72. As described above, the second control unit 512 drives the temperature control device 133 with the battery power when supply of the external power is prohibited at the time of driving the temperature control device 133.

On the other hand, when the prohibition flag is OFF (NO in S71), the second control unit 512 determines in S73 whether the battery power has been set as the temperature control power. In the present embodiment, the determination result of S73 is YES when S23 of FIG. 9 has been performed. When YES in S73, the process proceeds to S72. As described above, S72 is performed when increased charging is requested (YES in S13 of FIG. 9) and the amount of stored power of the energy storage device is large (YES in S22 of FIG. 9). Accordingly, the power stored in the main battery 131a is consumed by driving the temperature control device 133 before the time ts. As a result, the capacity of the main battery 131a is likely to become large enough for the scheduled increased charging.

On the other hand, when the battery power has not been set as the temperature control power (NO in S73), the second control unit 512 drives the temperature control device 133 with the external power to perform the temperature control of the main battery 131a in S74.

After the second control unit 512 performs either S72 or S74, the second control unit 512 determines in S75 whether the temperature control end condition set in the process shown in FIG. 11 is satisfied. The temperature control that is performed in S72 or S74 is continued until the temperature control end condition is satisfied. This temperature control ends when the temperature control end condition is satisfied (YES in S75). The series of steps shown in FIG. 12 ends when the temperature control end condition is satisfied.

Figure 13:
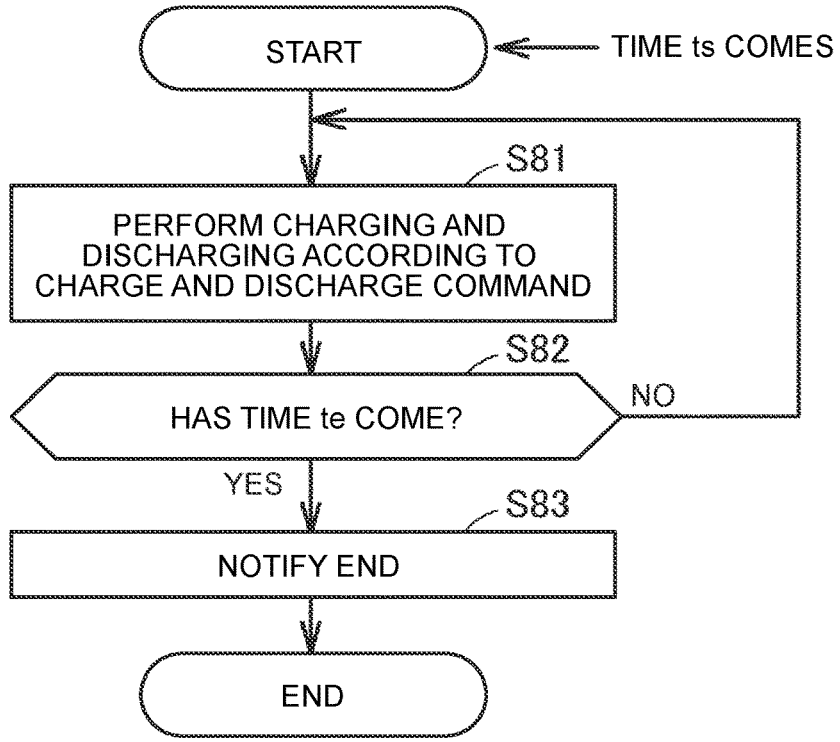
FIG. 13 is a flowchart of charge and discharge control of the energy storage device for performing requested power adjustment in the energy management method according to the embodiment of the present disclosure.

FIG. 13 is a flowchart showing charge and discharge control of the main battery 131a during the VPP request period. The process shown in this flowchart is started when the time ts (start time of the VPP request period) comes with the vehicle 50 plugged in. In the VPP request period, a charge and discharge command is sent from the server 30 to the vehicle 50.

Referring to FIG. 13 together with FIGS. 1 to 3, in S81, the first control unit 511 performs charge and discharge control of the main battery 131a according to the charge and discharge command received from the server 30. In the subsequent step S82, the first control unit 511 determines whether the time te (end time of the VPP request period) has come. S81 and S82 are repeated until the time te comes. When the time te comes (YES in S82), the first control unit 511 notifies the server 30 of the end of the charge and discharge control in S83, and then the series of steps shown in FIG. 13 ends.

As described above, the vehicle 50 performs the increased charging, reduced charging, or discharging scheduled in the first control unit 511 according to the command from the server 30 while being plugged in. The server 30 remotely controls the plugged-in vehicle 50 so that the increased charging, reduced charging, or discharging scheduled in the first control unit 511 is performed by the process shown in FIG. 13. The charge and discharge control of the main battery 131a is performed with the power grid PG electrically connected to the main battery 131a.

Next, operation examples of the vehicle 50 will be described with reference to FIGS. 14 and 15. In the operation examples shown in FIGS. 14 and 15 described below, it is predicted in S52 and S53 of FIG. 10 that the temperature TB will be lower than the desired temperature range at the time ts.

FIG. 14 shows an operation example of the vehicle 50 when increased charging is requested. Referring to FIG. 14, in this example, temperature control is performed immediately before the time ts. At the temperature control start timing, the SOC of the main battery 131a is lower than Th2. Accordingly, the second control unit 512 drives the temperature control device 133 (for example, an electric heater) with the external power to raise the temperature of the main battery 131a. As the temperature of the main battery 131a is controlled to be within the desired temperature range, the chargeable power of the main battery 131a (power corresponding to W-in) is increased. The increased charging scheduled in the first control unit 511 is then started at the time ts and ends at the time te. When increased charging is requested, it is presumed that the power grid PG is oversupplied not only at and after the time ts but also immediately before the time ts. It is therefore considered that using the external power for temperature control as described above increases the demand for the power grid PG and thus improves the supply and demand balance of the power grid PG. In FIG. 14, a change in SOC of the main battery 131a when the battery power is used for temperature control is shown by a dashed line for reference.

FIG. 15 shows an operation example of the vehicle 50 when discharging is requested. Referring to FIG. 15, in this example, the SOC of the main battery 131a is higher than Th1 at the temperature control start timing. Accordingly, the second control unit 512 drives the temperature control device 133 (for example, an electric heater) with the battery power to raise the temperature of the main battery 131a immediately before the time ts. As the temperature of the main battery 131a is controlled to be within the desired temperature range, the dischargeable power of the main battery 131a (power corresponding to W-out) is increased. The discharging scheduled in the first control unit 511 is then started at the time ts and ends at the time te. When discharging is requested, it is presumed that the power grid PG is undersupplied not only at and after the time ts but also immediately before the time ts. Therefore, it is considered that using the battery power for temperature control as described above reduces the demand for the power grid PG and thus suppresses a deterioration in power supply shortage in the power grid PG. In FIG. 15, a change in SOC of the main battery 131a when the external power is used for temperature control is shown by a dashed line for reference.

As described above, the control system (ECU 150) mounted on the vehicle 50 includes the third control unit 513 (third control device) that determines whether to permit supply of the external power before the time ts (predetermined start time) by using supply and demand information of the power grid PG (power network) (see FIG. 9). According to the third control unit 513, when the temperature control of the main battery 131a is performed before the start of the scheduled increased charging, reduced charging, or discharging, power supply from the power grid PG to the vehicle 50 is prohibited according to the supply and demand situation of the power grid PG. This suppressed a deterioration in power supply shortage in the power grid PG. The above control system can appropriately perform energy management (power adjustment) of the power grid PG and energy management of the vehicle 50.

In the energy management method according to the present embodiment, the power adjustment of the power grid PG is made using the vehicle 50 (power adjustment resource). The energy management method according to the present embodiment includes: requesting by the server 30 (management computer that manages the power grid PG) the vehicle 50 to start the power adjustment of the power grid PG at the time ts (predetermined start time) (FIG. 3); and performing the temperature control (temperature control of the main battery 131a) before the time ts by the vehicle 50 driving the temperature control device 133 with the external power (power supplied from the power grid PG to the vehicle 50) when the requested power adjustment is discharging and the amount of the stored power of the vehicle 50 is smaller than Th1 (predetermined first threshold) (NO in S31 and YES in S34 in FIG. 9) (S33 in FIG. 9 and FIG. 12). The energy management method according to the present disclosure further includes performing the temperature control before the time ts by the vehicle 50 driving the temperature control device 133 with the battery power (the stored power of the vehicle 50), when the requested power adjustment is the discharging and the amount of the stored power of the vehicle 50 is equal to or larger than Th1 (YES in S31 and YES in S34 in FIG. 9) (S32 in FIG. 9 and FIG. 12). The energy management method according to the present disclosure further includes performing the temperature control before the time ts by the vehicle 50 driving the temperature control device 133 with the external power, when the requested power adjustment is increased charging and the amount of the stored power of the vehicle 50 is smaller than Th2 (predetermined second threshold) (YES in S13 and NO in S22 in FIG. 9) (S21 in FIG. 9 and FIG. 12). According to the energy management method of the present embodiment, the energy management (power adjustment) of the power grid PG and the energy management of the vehicle 50 can be appropriately performed.

In the above embodiment, the server 30 causes the vehicle 50 to perform the scheduled increased charging, decreased charging, or discharging by remote control. However, the present disclosure is not limited to this. When the vehicle 50 receives the VPP request signal, the increased charging, decreased charging, or discharging of the main battery 131a requested by the VPP request signal may be scheduled in the first control unit 511, and a charge and discharge schedule requested by the VPP request signal (for example, a change in charge and discharge power during the VPP request period) may be registered in the first control unit 511. The registered charge and discharge schedule may be stored in the storage device 153. The first control unit 511 may perform the charge and discharge control of the main battery 131a according to the registered charge and discharge schedule when the time is (start time of the charge and discharge schedule) comes.

The charge and discharge map is not limited to the map shown in FIG. 5. For example, the change of W-in according to the temperature TB is different from the change of W-out according to in temperature TB. The method for determining the desired temperature range is not limited to the method described above, and may be changed as appropriate. For example, when the VPP request signal requests increased charging, the desired temperature range may be varied according to the required power value. The temperature control end condition is not limited to the condition described above, and may be changed as appropriate. For example, the requirement regarding the amount of the stored power may be set for the temperature control end condition for either or both of reduced charging and discharging. Regarding the method for switching between permission and prohibition of supply of the external power (OFF and ON of the prohibition flag), supply of the external power need only to be switched between permission and prohibition according to the supply and demand situation of the power grid PG, and need not necessarily be permitted or prohibited in the manner shown in FIG. 9. Of the steps shown in FIG. 9, unnecessary steps may be omitted.

Figure 16:
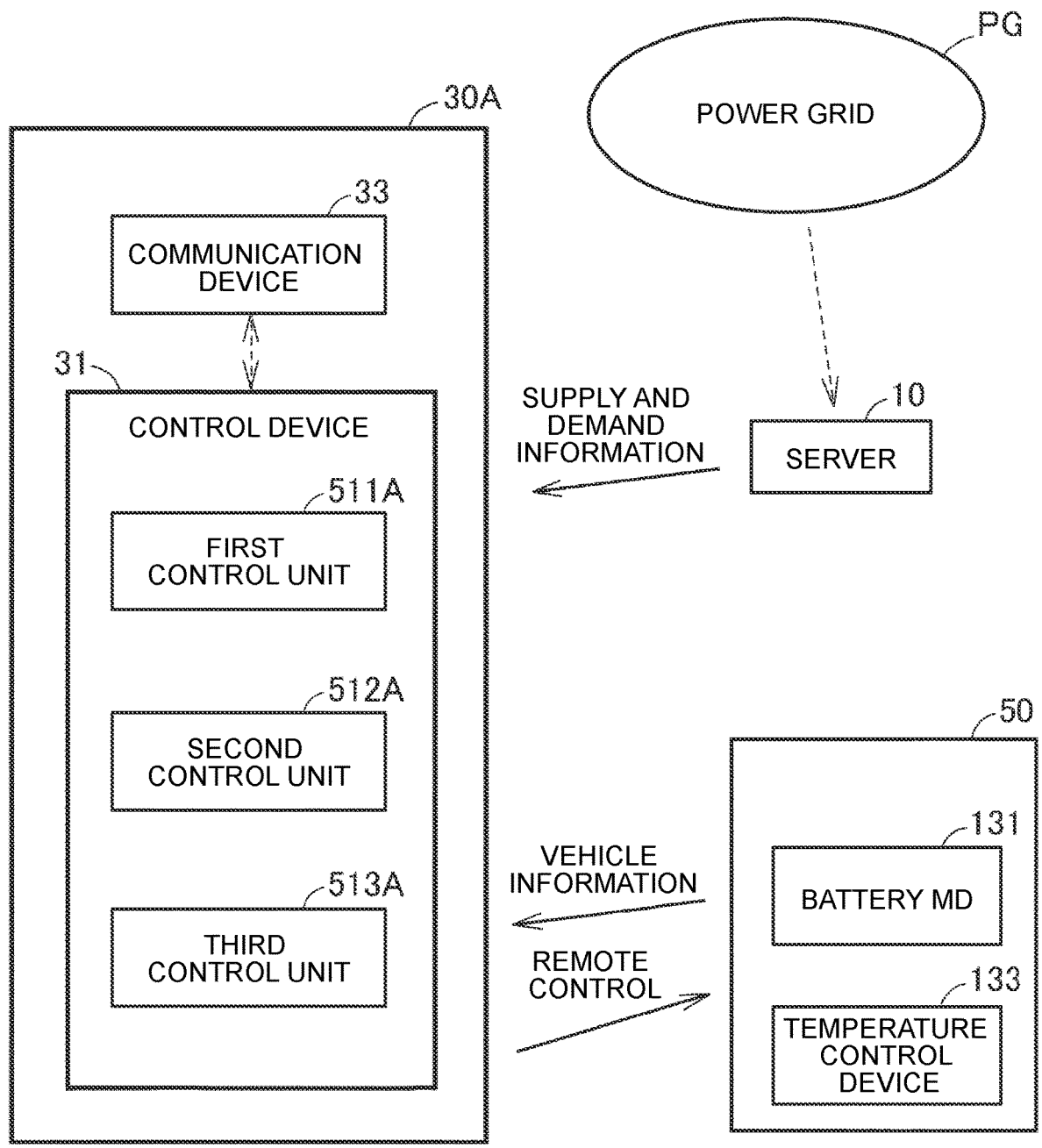
FIG. 16 shows a modification of the control system shown in FIG. 4.

The functions of the first control unit 511, the second control unit 512, and the third control unit 513 that are implemented in the vehicle 50 may be implemented in the server 30. FIG. 16 shows a modification of the configuration of the control system shown in FIG. 4.

Referring to FIG. 16, a server 30A according to this modification includes a first control unit 511A, a second control unit 512A, and a third control unit 513A. The functions of the first control unit 511A, the second control unit 512A, and the third control unit 513A are similar to those of the first control unit 511, the second control unit 512, and the third control unit 513 of the ECU 150 shown in FIG. 4, respectively. In the modification, the first control unit 511A, the second control unit 512A, and the third control unit 513A are an example of the "first control device," the "second control device," and the "third control device" according to the present disclosure, respectively.

The first control unit 511A monitors the supply and demand situation of the power grid PG, and based on the supply and demand situation of the power grid PG, schedules increased charging, reduced charging, or discharging of the main battery 131a mounted on the vehicle 50 and sets the start time (time ts) of the increased charging, reduced charging, or discharging of the main battery 131a. The first control unit 511A may acquire the supply and demand information of the power grid PG from the server 10. The second control unit 512A remotely controls the plugged-in vehicle 50 to perform temperature control in a manner similar to that of the second control unit 512 (FIG. 4). The second control unit 512A drives the temperature control device 133 as necessary to perform the temperature control of the main battery 131a immediately before the time ts. The second control unit 512A selects appropriate temperature control power (battery power or external power) based on the supply and demand situation of the power grid PG. The third control unit 513A remotely controls the plugged-in vehicle 50 so that the scheduled increased charging, reduced charging, or discharging is performed. The third control unit 513A performs charge and discharge control of the main battery 131a according to the supply and demand situation of the power grid PG. The method for remotely performing charge and discharge control of the main battery 131a (remote charging and discharging) may be the same as the method in the above embodiment (see FIG. 13).

The server 30A according to the modification can also appropriately perform power adjustment of the power grid PG and energy management of the vehicle 50.

The configuration of the power system including the management computer for the power grid is not limited to the configuration shown in FIG. 3. For example, the server 10 may have the functions of the server 30, and the server 30 may be omitted. The server 10 can function as the management computer for the power grid. The electric power company may be spun off by business. The power producer and the power transmission and distribution business operator may be different companies. The vehicle 50 may be a vehicle that belongs to the user who signed an incentive contract with the power producer or the power transmission and distribution business operator. The power grid is not limited to a large-scale power network (power grid) developed as an infrastructure, and may be a microgrid.

The configuration of the circuit for controlling the temperature control device 133 is not limited to the configuration shown in FIG. 2. For example, the relay for switching between permission and prohibition of supply of the external power may be provided between the inlet 110 and the charger and discharger 120.

The configuration of the vehicle is not limited to the configuration shown in FIG. 1. For example, the vehicle may be contactlessly chargeable. The vehicle is not limited to a passenger car, and may be a bus or a truck. The vehicle may be capable of autonomous driving or may have a flying function. The vehicle may be a vehicle capable of unmanned driving (for example, an automated guided vehicle or an agricultural machine).

The vehicle may be DC-chargeable. The vehicle may respond to a request for energy management using DC EVSE. The power conversion circuit of the charger and discharger 120 may be mounted on the EVSE instead of the vehicle. An external computer (for example, the server 30) may perform energy management by remotely controlling the power conversion circuit mounted on the EVSE.

The vehicle may be configured to perform only external charging out of external charging and external power feeding, and may be configured to respond only to a request for energy management for charging (for example, a request for increased charging or reduced charging). The vehicle may respond to a request for energy management for charging by using EVSE that is not compatible with reverse power flow.

The configuration of the temperature control device is not limited to the configuration of the temperature control device 133 according to the above embodiment. The temperature control device may use any heating device and any cooling device. For example, the temperature control device may include a heat pump. The temperature control device may be composed of either a heating device or a cooling device. For example, the heating device may be omitted in a form in which the normal service temperature range of the energy storage device is a low temperature range. The cooling device may be omitted in a form in which the normal service temperature range of the energy storage device is a high temperature range.

The power adjustment resource may be a moving body other than a vehicle (ship, airplane, drone, walking robot, robot cleaner, space probe, etc.) or may be a stationary energy storage system (ESS).

The embodiment disclosed herein should be considered as illustrative and not restrictive in all respects. The scope of the present disclosure is shown by the claims rather than by the above embodiment and is intended to include all modifications within the meaning and scope equivalent to those of the claims.

What is claimed is:

1. A control system configured to control a power adjustment resource including an energy storage device and a temperature control device, the energy storage device being configured to electrically connect to a power network, the temperature control device being configured to perform temperature control of the energy storage device, the control system comprising:
   a first control device configured to control charging and discharging of the energy storage device such that scheduled increased charging, reduced charging, or discharging of the energy storage device is started at predetermined start time;
   a second control device configured to
      control the temperature control device so as to perform the temperature control of the energy storage device,
      select either external power or stored power, the external power being electric power supplied from the power network to the power adjustment resource, and the stored power being electric power stored in the power adjustment resource, and
      drive the temperature control device using the selected power; and
   a third control device configured to
      determine whether to permit power supply from the power network to the power adjustment resource before the predetermined start time based on supply and demand information of the power network, and
      switch between permission and prohibition of the power supply.

2. The control system according to claim 1, wherein the second control device is configured to drive the temperature control device before the predetermined start time, when the second control device predicts a temperature of the energy storage device at the predetermined start time to be out of a desired temperature range.

3. The control system according to claim 2, wherein the second control device is configured to drive the temperature control device using the stored power of the power adjustment resource, when the power supply is prohibited at a time of driving the temperature control device.

4. The control system according to claim 1, wherein the third control device is configured to permit the power supply when the supply and demand information of the power network indicates oversupply.

5. The control system according to claim 4, wherein the third control device is configured to prohibit the power supply when the supply and demand information of the power network indicates undersupply and an amount of the stored power of the power adjustment resource is equal to or larger than a predetermined first threshold.

6. The control system according to claim 1, wherein the first control device is configured to charge the energy storage device with the external power supplied from the power network to the power adjustment resource before the predetermined start time, when the discharging of the energy storage device is scheduled and the power supply is permitted.

7. The control system according to claim 1, wherein the second control device is configured to drive the temperature control device using stored power of the energy storage device, before the predetermined start time, to bring an amount of the stored power of the energy storage device closer to a predetermined second threshold, when the increased charging of the energy storage device is scheduled in the first control device and the amount of the stored power of the energy storage device is equal to or larger than the predetermined second threshold.

8. The control system according to claim 1, wherein the second control device is configured not to drive the temperature control device before the predetermined start time when the reduced charging of the energy storage device is scheduled in the first control device and amount of the stored power of the power adjustment resource is smaller than a predetermined third threshold.

9. The control system according to claim 1, wherein:
   the power adjustment resource is an electrified vehicle that runs using power stored in the energy storage device;
   the control system is mounted on the electrified vehicle;
   the electrified vehicle is configured to receive a request signal that includes the supply and demand information of the power network;
   the electrified vehicle is configured to be scheduled for the increased charging, the reduced charging, or the discharging that is requested by the request signal;
   the electrified vehicle is configured to set the predetermined start time to time specified by the request signal; and
   the electrified vehicle is configured to perform the scheduled increased charging, the scheduled reduced charging, or the scheduled discharging with the power network being electrically connected to the energy storage device.

10. The control system according to claim 1, wherein:
    the control system is mounted on a management computer that manages the power network;
    the management computer is configured to receive an amount of the stored power of the power adjustment resource from the power adjustment resource;
    the management computer is configured to schedule the increased charging, the reduced charging, or the discharging and set the predetermined start time, based on a supply and demand situation of the power network; and
    the management computer is configured to remotely control the power adjustment resource with the power network being electrically connected to the energy storage device in such a manner that the scheduled increased charging, the scheduled reduced charging, or the scheduled discharging is performed.

11. An energy management method configured to perform power adjustment of a power network by using a power adjustment resource including an energy storage device, and a temperature control device, the energy storage device being configured to electrically connect to the power network, the temperature control device being configured to perform temperature control of the energy storage device, the energy management method comprising:
    requesting, by a management computer that manages the power network, the power adjustment resource to start the power adjustment of the power network at predetermined start time;
    performing the temperature control of the energy storage device before the predetermined start time by the power adjustment resource driving the temperature control device by using power supplied from the power network to the power adjustment resource, when the power adjustment requested by the management computer is discharging and an amount of stored power of the power adjustment resource is smaller than a predetermined first threshold;

performing the temperature control of the energy storage device before the predetermined start time by the power adjustment resource driving the temperature control device by using the stored power of the power adjustment resource, when the power adjustment requested by the management computer is the discharging and the amount of the stored power of the power adjustment resource is equal to or larger than the predetermined first threshold;

performing the temperature control of the energy storage device before the predetermined start time by the power adjustment resource driving the temperature control device by using the power supplied from the power network to the power adjustment resource, when the power adjustment requested by the management computer is increased charging and the amount of the stored power of the power adjustment resource is smaller than a predetermined second threshold; and starting the power adjustment requested by the management computer at the predetermined start time by the power adjustment resource.

* * * * *